United States Patent
Coppes et al.

(10) Patent No.: US 10,513,830 B2
(45) Date of Patent: Dec. 24, 2019

(54) FABRICATING A PLASTIC STORMWATER CHAMBER

(71) Applicant: Infiltrator Water Technologies, LLC, Old Saybrook, CT (US)

(72) Inventors: Bryan A Coppes, Old Saybrook, CT (US); Paul R Holbrook, Old Saybrook, CT (US); Roy E Moore, Jr., Killingworth, CT (US); Mark Youngclaus, Waterford, CT (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 422 days.

(21) Appl. No.: 14/993,858

(22) Filed: Jan. 12, 2016

(65) Prior Publication Data
US 2016/0186423 A1 Jun. 30, 2016

Related U.S. Application Data

(63) Continuation-in-part of application No. 14/025,773, filed on Sep. 12, 2013, now Pat. No. 9,233,775.

(51) Int. Cl.
| | |
|---|---|
| *B29C 51/08* | (2006.01) |
| *B29L 16/00* | (2006.01) |
| *E01F 5/00* | (2006.01) |
| *E03F 1/00* | (2006.01) |

(52) U.S. Cl.
CPC ............... *E01F 5/00* (2013.01); *E03F 1/003* (2013.01); *B29C 51/082* (2013.01); *B29L 2016/00* (2013.01); *Y10T 29/4998* (2015.01); *Y10T 29/49982* (2015.01)

(58) Field of Classification Search
CPC ...... B65D 90/02; B65D 88/52; Y10T 29/4998; Y10T 29/29982
USPC .......... 29/527.1, 527.2; 220/4.16, 4.12, 4.08, 220/4.04
See application file for complete search history.

(56) References Cited

U.S. PATENT DOCUMENTS

| | | | | |
|---|---|---|---|---|
| 4,245,924 A * | 1/1981 | Fouss | ................. | B29C 66/5346 138/119 |
| 4,541,256 A * | 9/1985 | Green | .................. | F16B 41/005 16/386 |
| 4,615,543 A * | 10/1986 | Cannon | ................... | F16L 35/00 166/241.4 |
| 6,193,119 B1 * | 2/2001 | Schwarm | ............... | A45F 5/021 224/197 |
| 6,297,472 B1 * | 10/2001 | Bong | .................. | B23K 9/0203 219/125.12 |

(Continued)

*Primary Examiner* — Sarang Afzali
*Assistant Examiner* — Darrell C Ford
(74) *Attorney, Agent, or Firm* — C. Nessler

(57) ABSTRACT

A method of making a molded plastic arch shape cross section stormwater chamber having a corrugated wall comprises molding half chambers which are connected by hinges at a joint at the top of the chamber. The chambers may be compactly stored and transported in splayed out configuration. Later, upward force is applied to the hinge joint location of each chamber, so the half chambers are rotated by force of gravity, whereby a faying surface on each half chamber is urged toward the like surface of the other half chamber. The faying surfaces are then fused to each other, preferably as a result of prior heating or by melting of a fusion weld element that is captured in the space between the faying surfaces.

9 Claims, 14 Drawing Sheets

(56) References Cited

U.S. PATENT DOCUMENTS

| | | | | |
|---|---|---|---|---|
| 6,493,212 B1 * | 12/2002 | Clarke | ................ | A61N 1/372 |
| | | | | 361/509 |
| 7,189,027 B2 * | 3/2007 | Brochu | ................ | E03F 1/003 |
| | | | | 138/105 |
| 7,306,399 B1 * | 12/2007 | Smith | ................... | E03F 1/003 |
| | | | | 405/40 |
| 7,914,230 B2 * | 3/2011 | Moore, Jr. | ............. | E03F 1/003 |
| | | | | 405/46 |

* cited by examiner

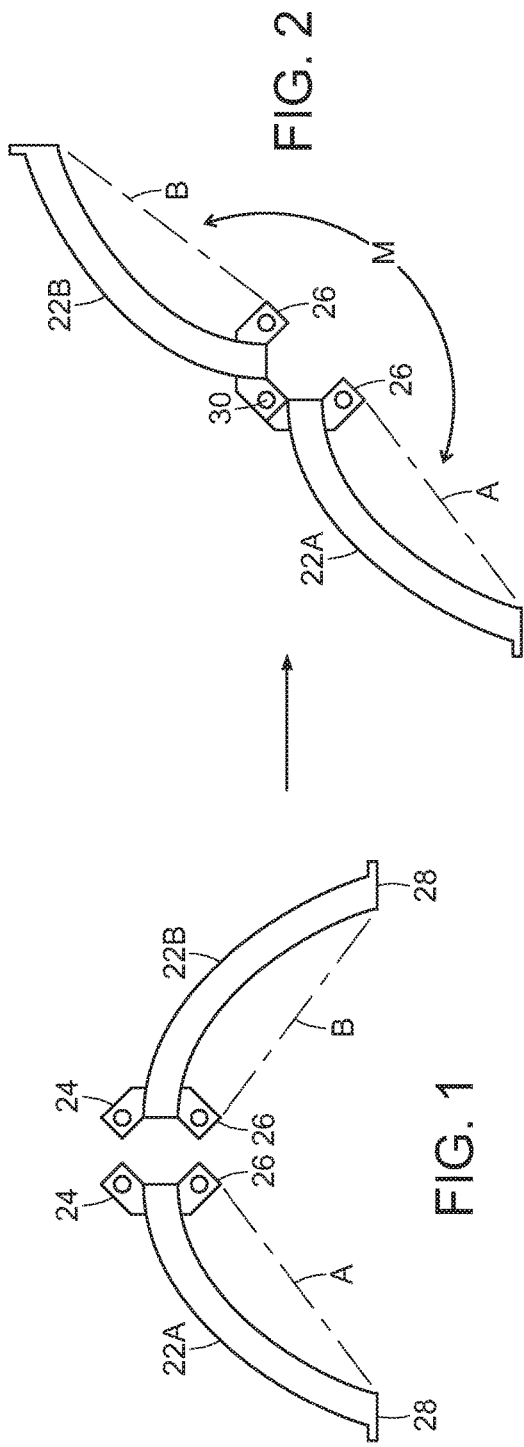
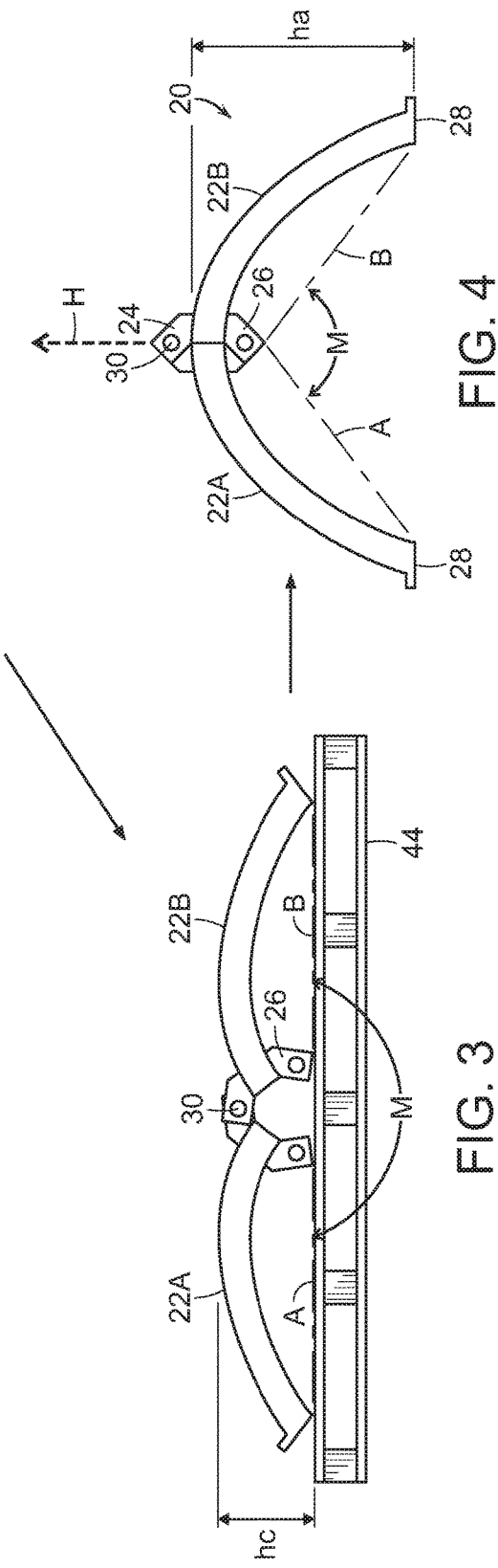

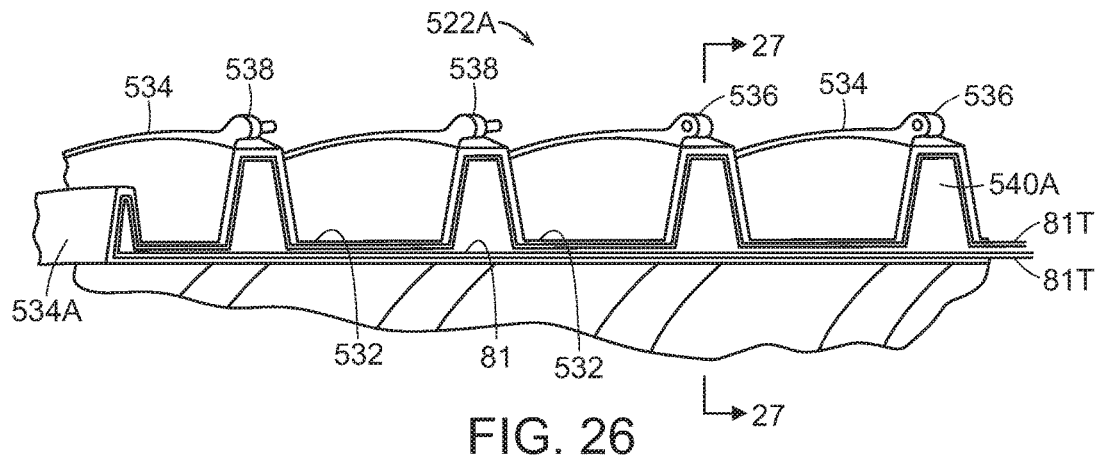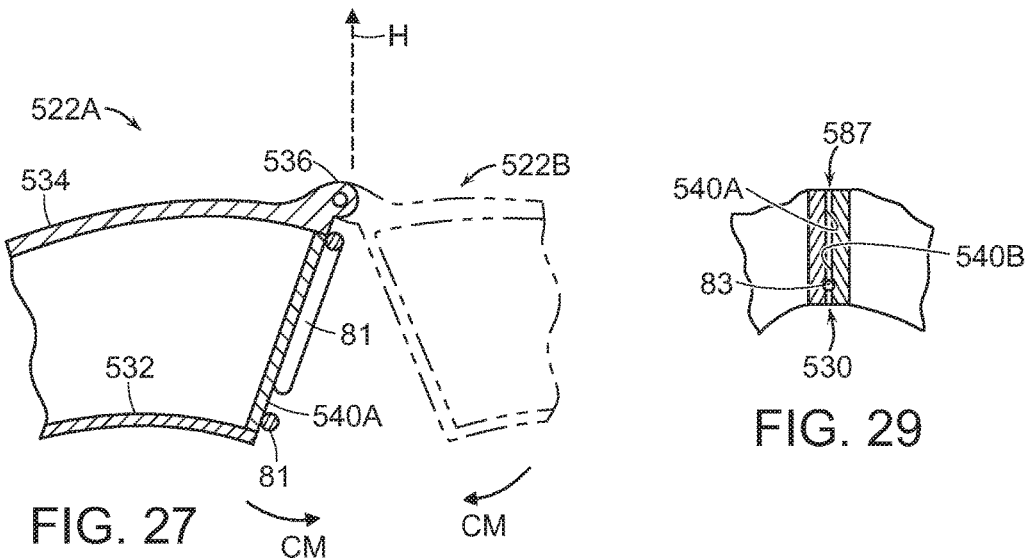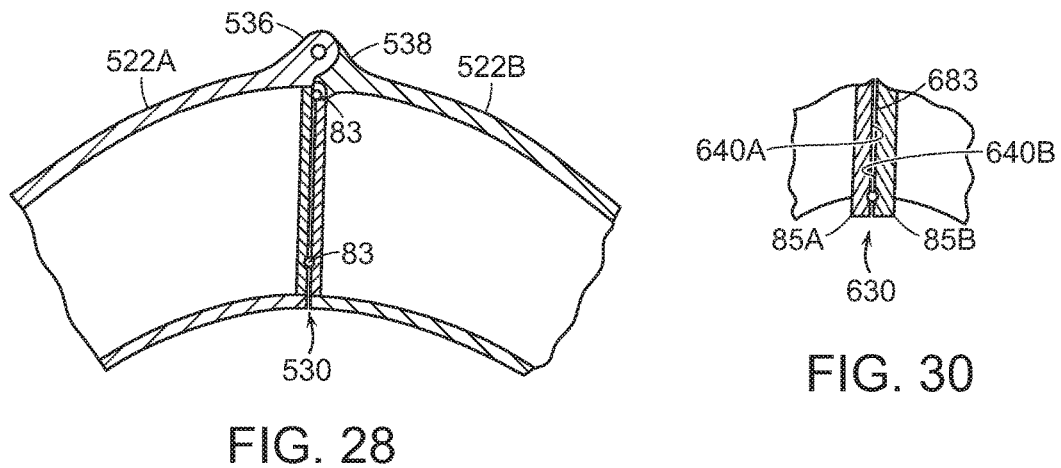

FABRICATING A PLASTIC STORMWATER CHAMBER

This application is a continuation-in-part of application Ser. No. 14/025,773, filed Sep. 12, 2013, now U.S. Pat. No. 9,233,775, issued Jan. 12, 2016.

TECHNICAL FIELD

The present invention relates to methods of making molded plastic chambers having arch shape cross sections, particularly large chambers for receiving, holding and dispersing water when buried beneath the surface of the earth.

BACKGROUND

Arch shape cross section storm chambers made from injection molded plastic have been used for a number of years to handle stormwater. In a typical installation, multiple rows of strings of interconnected chambers are placed on the floor of a cavity made in the earth surface and are then backfilled with crushed stone or the like. Stormwater, such as might run-off from a paved parking lot or roofs of buildings is channeled to the chambers so the waters can accumulate and then be dispersed over time by either percolation into the surrounding soil or by controllably flowing to a water course.

Some types of arch shape cross section chambers, exemplified by a corrugated chamber described in DeTuillo U.S. Pat. No. 5,087,151, have closed ends and are interconnected by pipes. Those chambers might be made by thermoforming of thermoplastic sheet. Another type of chamber, of more relevance to the invention described herein, is exemplified by the chambers shown in Kruger U.S. Pat. No. 7,118,306. Those kinds of chambers are preferably made by injection molding. The chambers have open ends. A string of chambers is assembled by overlapping a first end of one chamber on the second end of a like chamber, when the like chamber has been previously placed within a cavity in the earth. After installation, the chambers are backfilled, typically with crushed stone, and the stone is covered to create a soil surface, often a paved surface which can be used by motor vehicles. When so installed beneath the surface of the earth, stormwater chambers should have requisite strength and durability, particularly for bearing the overlying load of soil and any vehicular or other traffic.

Systems comprised of molded plastic arch shape cross section stormwater chambers are in functional- and cost-competition with other stormwater systems, including buried systems comprised of steel conduit and detention ponds. Generally, it is an objective to have storm chambers with larger and larger volumetric capacity per unit length, while of course still meeting the load bearing requirements. Whereas early plastic chambers used 20 years or more ago had a peak height of 12 inches, more recent chambers may be quite large. For example, a commercial Model 4500 stormwater chamber sold by Stormtech LLC, Rocky Hill, Conn. is 100 inches (2.54 m) wide at the base, about 60 inches (1.52 m) high, about 48 inches (1.22 m) long, and weighs about 120 pounds (55 kilograms). There is a generalized desire to commercialize even larger chambers.

There are practical problems encountered with making and handling large chambers. Among them are:

First, it is not easy to mold large chambers because they require large molding machines and machinery for handling the just-molded products. Large and thus less common injection molding machines can be costly.

Second, large chambers present problems with respect to storing and to shipping in economic fashion by truck—the most common mode. Typically chambers are nested one within the other to form a stack for shipment on pallet. But when the height of a chamber is large to begin with, then that means not many chambers can be nested before the height capacity of a ordinary highway truck is exceeded. For example, if the load height capacity of a truck is about 100 inches (254 cm) from the bed surface, and one chamber is 60 inches (152 cm) high, then there is only an about 40 inches (102 cm) of space for containing nested chambers. If the stack height is about 6 inches (15 cm) (the spacing between one chamber and next-nested chamber), then only 6-7 chambers can be stacked on top of the bottom chamber.

The issue of shipping chambers efficiently has been addressed in the past. In particular U.S. Pat. Nos. 4,245,924 and 4,360,042 of Fouss et al. describe an arch shape cross section conduit which has a molded-material hinge joint at the top. The corrugated side walls are foldable inwardly to the point that the opposing side base flanges meet at the lengthwise vertical center plane of the conduit. The conduit is shipped in such flattened condition. At the point of use, the base flanges are spread apart until a plastic fabric which connects the base flanges becomes taut and stops further movement. Generally, round conduits of the nature of corrugated pipe, which have so-called living hinges (thin foldable regions) are known. See U.S. Pat. No. 6,364,575 of Bradley et al. for an example.

SUMMARY

An object of the invention is to provide large stormwater chambers which have improved characteristics with respect to manufacturability, shipment and handling. A further object is to provide a means for making chambers comprising mated half chambers.

In accord with an embodiment of the invention, a molded plastic arch shape cross section stormwater chamber having a corrugated wall comprises separately molded half chambers which are connected by hinge joint at the top of the chamber. Preferably, the half chambers are substantially identical and are made in the same mold. Methods of molding the chambers enable providing a larger or smaller corrugation at one end of a chamber made from substantially identical half chambers.

Preferably, a chamber comprises two half chambers interconnected by hinge parts at the top of the chamber. Exemplary chambers assembled at the factory can be stored and shipped in splayed out in nominal 180 degree chord angle orientation; the arch flattened out and the base flanges widely separated. Storage and shipping costs are reduced since chambers can be stacked in splayed or flat condition. At a destination, typically near the point of use, a chamber can be lifted from the top of a stack of splayed chambers resting on a pallet by pulling upward in the vicinity of the top joint (which alternately may be characterized as pulling upward in proximity to the top joint), whereupon gravity will cause the half chambers to rotate relative to each other about the hinges, so the chamber articulates to the arch shape cross section which characterizes the use configuration, similar to a like chamber made in one piece.

In an embodiment of a method got putting mated half chambers into use configuration, mating surfaces (also called faying surfaces) proximate the top of the chamber are fusion welded to each other. Preferably a fusion weld element is captured between the mating surfaces at the top of the chamber and is caused to melt by means of electric resistance heating or electromagnetic induction heating while the hinged-together half chambers are thrust upwardly at the hinge location. When a chamber is lifted (or thrusted) upwardly, the weight of each half chamber causes the joint between the half chambers to close as the fusion weld element melts. In a preferred embodiment, the fusion weld process time and current are controlled, repeatedly to produce substantially identical chambers.

The foregoing and other objects, features and advantages of the present invention will become more apparent from the following description of preferred embodiments and accompanying drawings.

BRIEF DESCRIPTION OF THE DRAWINGS

FIG. 1 schematically shows in end view two identical half chambers closely spaced apart from each other ready for mating at a lengthwise hinge joint. Each chamber having an imaginary chord A, B. FIGS. 1, 2, 3 and 4 represent sequential configurations of a chamber.

FIG. 2 shows the half chambers of FIG. 1 in joined-together condition, also called the engagement configuration. Angle M between the chords A, B is greater than 180 degrees.

FIG. 3 shows the joined-together half chambers lying on a pallet. Angle M is 180 about degrees.

FIG. 4 shows the joined together half chambers suspended from a tether at the top hinge joint. Angle M is acute.

FIG. 10A is a schematic end view showing how stirrup plates at the top of half chambers mate during rotation of the half chambers about the top hinge joint.

FIG. 10B is a fragmentary end view related to FIG. 10A, showing mated stirrup plates in their home or rest position, when the chamber has an arch shape cross section.

FIG. 10C is a perspective view of the joint portion of a half chamber, showing a vertical flange and associated stirrup plate, along with pyramidal shape dowels.

FIG. 26 is a perspective view of the top portion of a portion of half chamber, where the joint surface has a fusion weld element tack-welded to it.

FIG. 27 is a vertical cross section of the top of the half chamber of FIG. 26, with a mated phantom half chamber, and with an upward-thrusting force H.

FIG. 28 is a vertical cross section like that of FIG. 27 showing the welded joint of two half chambers.

FIG. 29 is a more detail view of the joint shown in FIG. 28.

FIG. 30 is a view like FIG. 29, shown an alternative embodiment joint formed by hot plate welding, where the top half chambers have stops to limit closure of the joint.

DESCRIPTION

Stormwater chambers and their use have been described in the art. In particular, reference may be made to commonly owned U.S. Pat. No. 7,118,306 of Kruger et al., entitled "Stormwater Management System" and U.S. Pat. No. 6,991,734 of Smith et al, entitled "Solids Retention in Stormwater System." The disclosures of the foregoing patents are hereby incorporated by reference.

In the generality of the invention, an arch shape curve cross section chamber is comprised of two mating half chambers which are made by injection molding of a thermoplastic such as polyethylene or polypropylene, typically with a wall thickness of about 0.2 inches. A chamber embodiment of the present invention is characterized by a hinged lengthwise joint at the top of the chamber. A preferred hinged joint in the present invention is distinguished from a so-called living hinge, wherein half chambers are integrally connected by a thin web of material, as in the Fouss et al. patents mentioned in the Background. Each half chamber is molded separately and then mated with the other half chamber to form a whole chamber. In embodiments of the present invention, lengthwise motion of the half chambers relative to each other enables making and unmaking of the joint therebetween.

Figure 5:
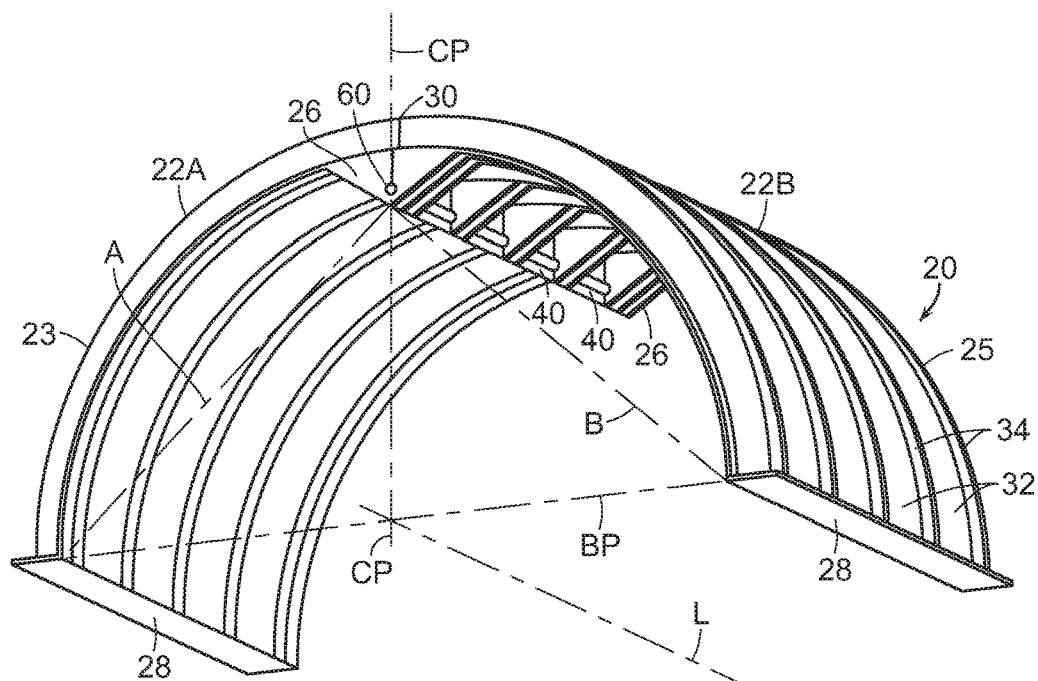
FIG. 5 is a perspective view of a chamber comprised of half chambers joined-together at a top hinge joint.

FIG. 5 shows chamber 20, an embodiment of the present invention. Chamber 20 has opposing sidewalls 23, 25 which together define an arch shaped cross-section and interior concavity of the chamber. Chamber 20 is comprised of half chamber 22A and identical half chamber 22B. The top portions of the half chambers are connected to each other at lengthwise joint 30 at the top of the chamber. Alternating peak corrugations 34 and valley corrugations 32 (also called simply "peak" and "valleys") run transverse to the length axis L of the chamber within the sidewalls, from each base flange 28 to the top of the chamber. Joint 30 lies along the lengthwise vertical center plane which contains vertical axis CP and length axis L. The top portions of each chamber are characterized by spaced apart ribs 26 that run transversely to the length of the chamber from the concave underside of each half chamber sidewall to a vertical lengthwise stirrup plate 40 which plate is on or closely proximate to the lengthwise vertical center plane of the chamber.

FIGS. 1-4 are simplified end views of half chambers which illustrate some basic aspects of the present invention. FIGS. 1-4 are to be considered sequentially. For purposes of description here, each half chamber 22A, 22B has an imaginary line A, B (hereafter referred to as the chord) which runs from the inner edge of the base flange 28 to that part of the half chamber which is in the vicinity of the top of the half chamber (which alternately may be characterized as being in proximity to the top joint) and which contacts a flat surface, when the half chamber is placed on the flat surface with its interior concavity facing the flat surface. In the simplified embodiment of FIG. 1-4, that contact is made at the lower edge of rib 26. Chords A, B are also shown in FIG. 5.

FIG. 1 shows two half chambers 22A and 22B after molding and before they are connected to each other. As illustrated by FIG. 2, the joint 30 is made by hinge assemblies 24. (In FIGS. 1-4 and some other view, the hinge parts 24 are shown in simplified fashion. Mating hinge parts 36, 38 which function as hinge assemblies 24 are described in more detail below, for example, in connection with FIG. 9.) Preferably, the hinge parts 24 may be longitudinally engaged and disengaged from each other only when angle M between the chords A, B is significantly greater than 180 degrees, i.e., 10-20 or more degrees greater. As will be appreciated from the details below, when the preferred half chambers are pivoted relative to each other at the hinge points, so that the angle between the chords is significantly less than 180 degrees, the mated hinge parts cannot disengage from each other.

FIG. 3 shows the joined-together half chambers 22A, 22B lying in splayed out fashion on a pallet 44, ready for shipment. Angle M is nominally 180 degrees.

FIG. 4 illustrates what happens when a chamber 20 is lifted vertically from the pallet by pulling upwardly in vicinity of the joint 30, that is, generally at the top of the chamber, by such as a strap H shown in phantom. The half chambers 22A, 22B rotate relative to each other so that angle M becomes an acute angle, i.e. less than 180 degrees. Ribs 26 and associated elements (for example, vertical stirrup plates 40 or substitutional plain flanges, described below) on one half chamber contact corresponding plates/flanges on the other half chamber, and thereby limit how small angle M can become. That limiting smallest value of angle M is chosen so that the bottoms of the base flanges 28 lie parallel to each other in the base plane BP. In this condition, the interior concavity of the chamber, that is the cross section, is arch shaped, as illustrated in FIG. 5, and the chamber is suited for placement at its use location, typically in a cavity in the earth.

In FIG. 4 and FIG. 5, chamber 20 is in what is called here its use configuration, as distinguished from its transport configuration shown in FIG. 3 or as distinguished from an in-between configuration. Chamber 20 has a height ha in its use configuration which is much lesser than the height hc it has in its transport configuration. For example hc is only about 40-50 percent of ha. Thus it will be appreciated that about twice as many nested chambers can be contained within a given stack height on a pallet when the chambers are splayed as shown in FIG. 3, assuming the stack height of nesting (the vertical distance between corresponding features of stacked items) is nominally the same in both conditions. Thus the economic and practical advantage of the invention for reducing cost of storing and shipping chambers will be appreciated, as more chambers can be fit into a given space.

Figure 7:
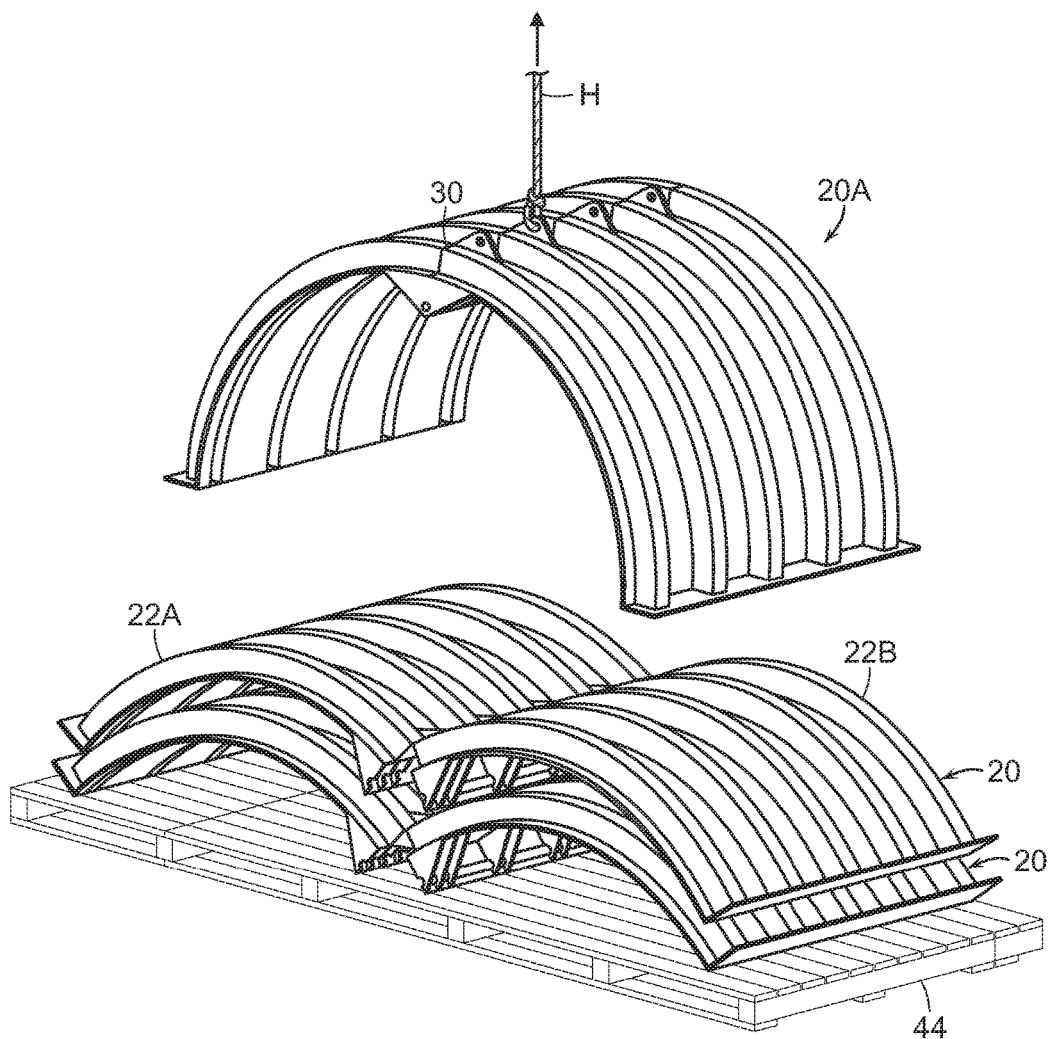
FIG. 7 is a perspective view showing a stack of two splayed chambers resting on a pallet with a third chamber just having been lifted from the stack by a tether attached to the joint region.

FIG. 7 is a somewhat less schematic illustration of what is shown in FIGS. 3 and 4. FIG. 7 shows two splayed out chambers 20 resting on a pallet 44 shown in phantom, while another chamber 20A is being raised up by a schematically shown lifting strap H that is attached to the chamber top. When a chamber is lifted from its splayed transport position on a pallet, by lifting in vicinity of its top joint, gravity will cause the angle M to decrease until interference at joint parts prevents further decrease. As described below, this method of lifting it advantageous when each half chamber is welded to the other at joint 30.

Figure 8:
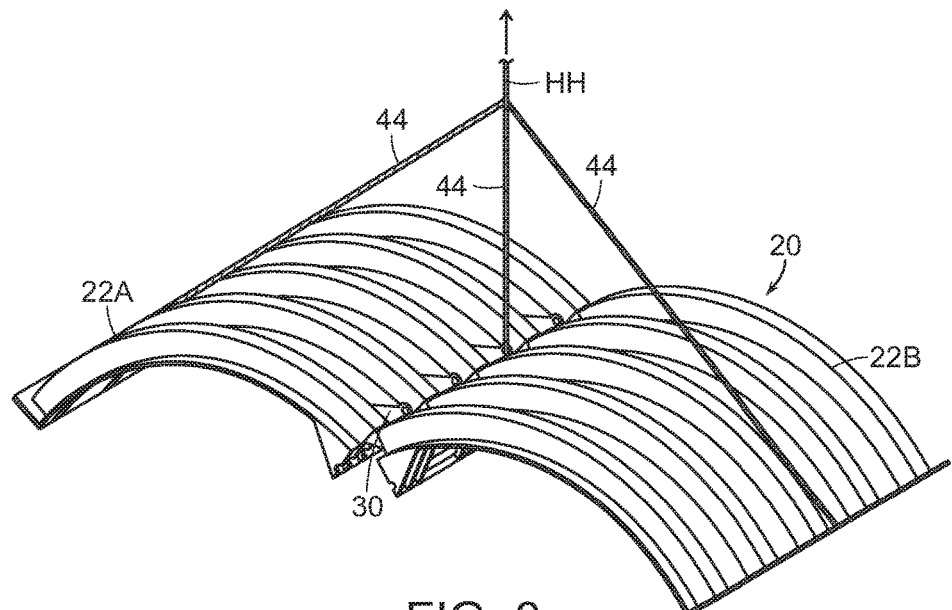
FIG. 8 is a perspective view showing an alternate embodiment for lifting a chamber from the stack of FIG. 7, wherein the chamber maintains its splayed shape during lifting.

While a preferred way of lifting a chamber 20 from a pallet is that which was described in connection with FIG. 7 and FIG. 4, alternative modes of lifting may be used. For example, FIG. 8 shows a lifting strap HH with leaders 44 running to three points on the chamber 20; the chamber is being lifted from the stack while preventing gravity-induced pivoting of the half chambers relative to each other. After the chamber 20 is placed on the ground nearby, it can then be lifted at the center joint by a strap or by manual lifting, or it can be otherwise manipulated to cause it to assume the desired arch shape cross section shown in FIG. 5. The FIG. 8 alternative mode of lifting requires less clearance space above a pallet of stacked splayed-out chambers than does the mode of FIG. 7. Of course, another way of removing a chamber from a stack or pallet is for workers manually to lift it by the edges.

The manner in which hinge assembly 24 can be engaged and disengaged (if ever desired) is of particular advantage in the manufacturing and transporting process of the present invention. In a preferred embodiment of the method invention, a first half chamber 22A is injection molded first, removed from the mold, and laid on the pallet 44. Then an identical second half chamber 22B is injection molded in the same mold, removed from the mold, and then moved through space to proximity to the first half chamber 22A, as by an industrial robot. The second half chamber is hingedly engaged with the first half chamber using techniques such as those described below. During the hinge-engagement, the half chambers are oriented to each other as shown in FIG. 2; that is, the included angle between the chords is greater than 180 degrees, and thus the mating hinge parts of the two half chambers can be mated to at a multiplicity of hinge assemblies 24 spaced apart along the length of the top of the chamber. In a preferred embodiment, to accomplish the hinge engagement, the second half chamber 22B is moved lengthwise relative to the static half chamber 22A, or vice versa. After the hinges are engaged, half chamber 22B is rotated downwardly onto the surface of the pallet to a position like that shown in FIG. 3 and FIG. 7, whereupon the hinges cannot be disengaged; and, the chamber is ready for storage, shipment and later lifting when that is desired.

Mating the half chambers shortly after removal from the molding machine provides an unexpected advantage in that good fit and easy engagement, in particular at the hinge parts, is assured. Experience shows that the shrinkage, or dimensional change of a molded part upon cooling or with time after cooling, can vary from part to part within a run, or amongst parts from one run compared to parts from another run. When the parts are large, as are half chamber embodiments of the present invention, the dimensional changes can be large enough in an absolute sense adversely to affect the fit between half chambers, to the extent they might not engage.

Figure 9:
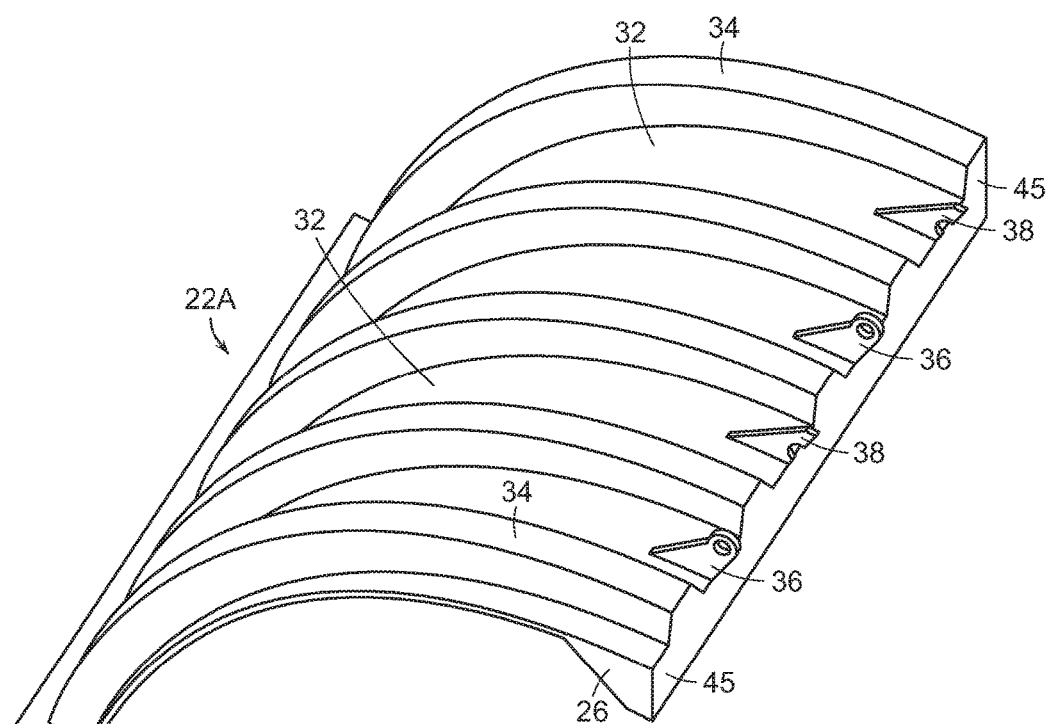
FIG. 9 is a perspective view looking down onto a half chamber, showing hinge and joint features.
Figure 10:
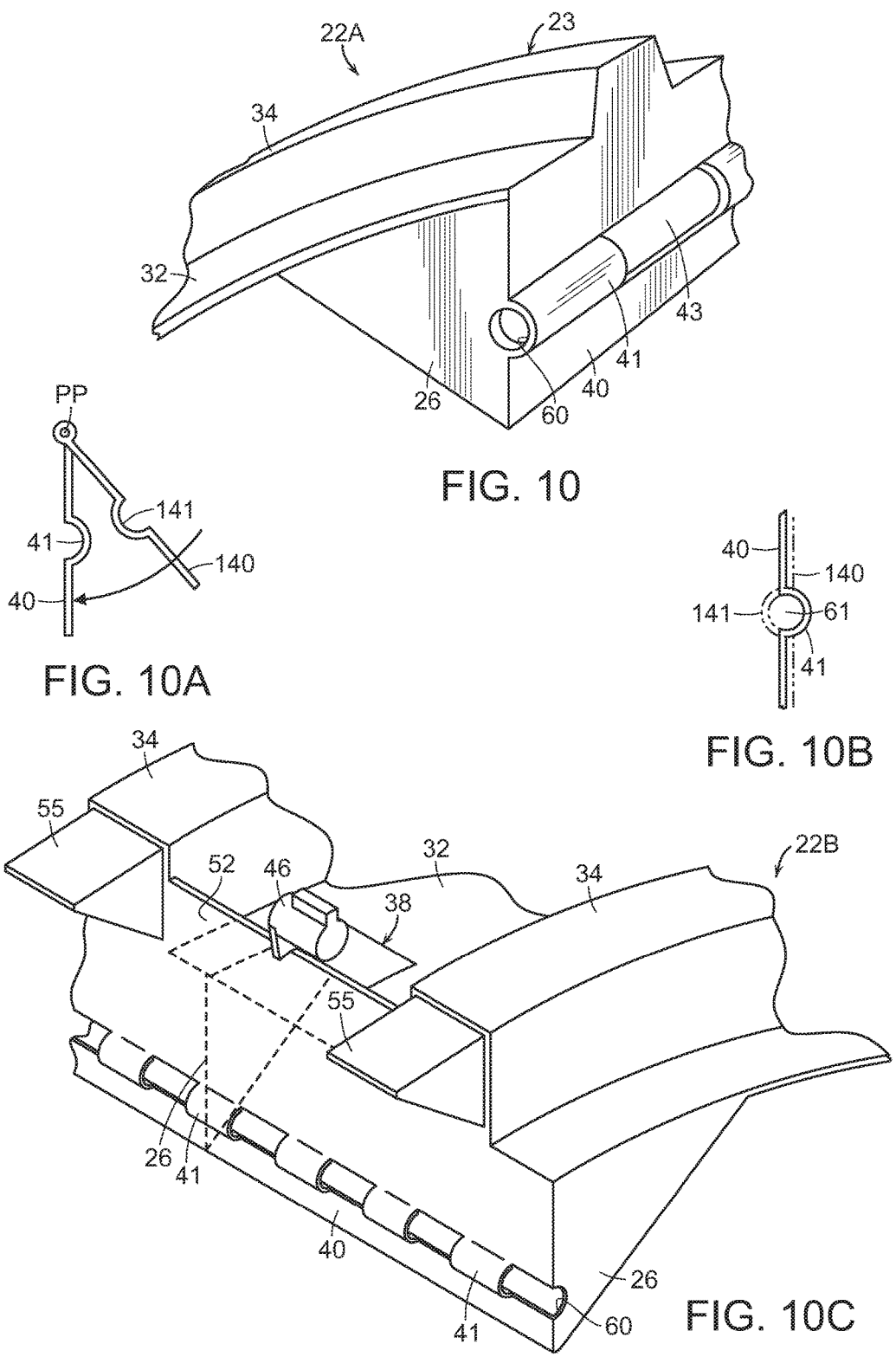
FIG. 10 is a close-up view of the joint at the top of a half chamber like that shown in FIG. 9.
Figure 11:
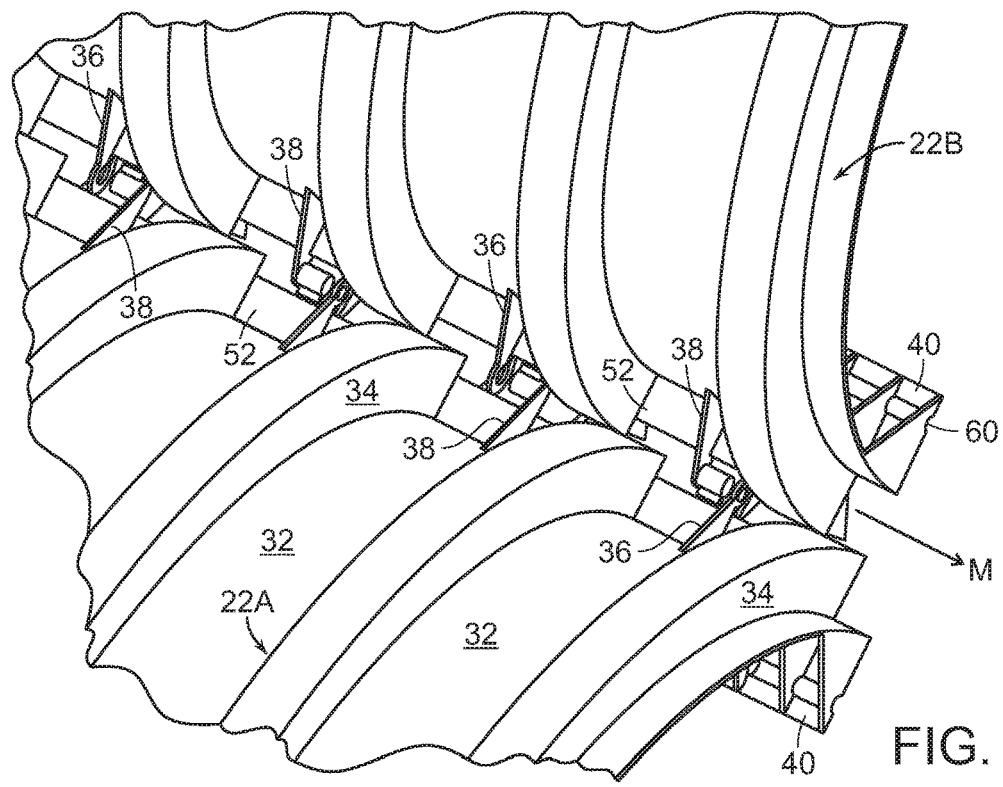
FIG. 11 is a perspective view looking down onto the top of two half chambers, showing how the hinge parts are configured to engage when there is lengthwise relative motion.
Figure 12:
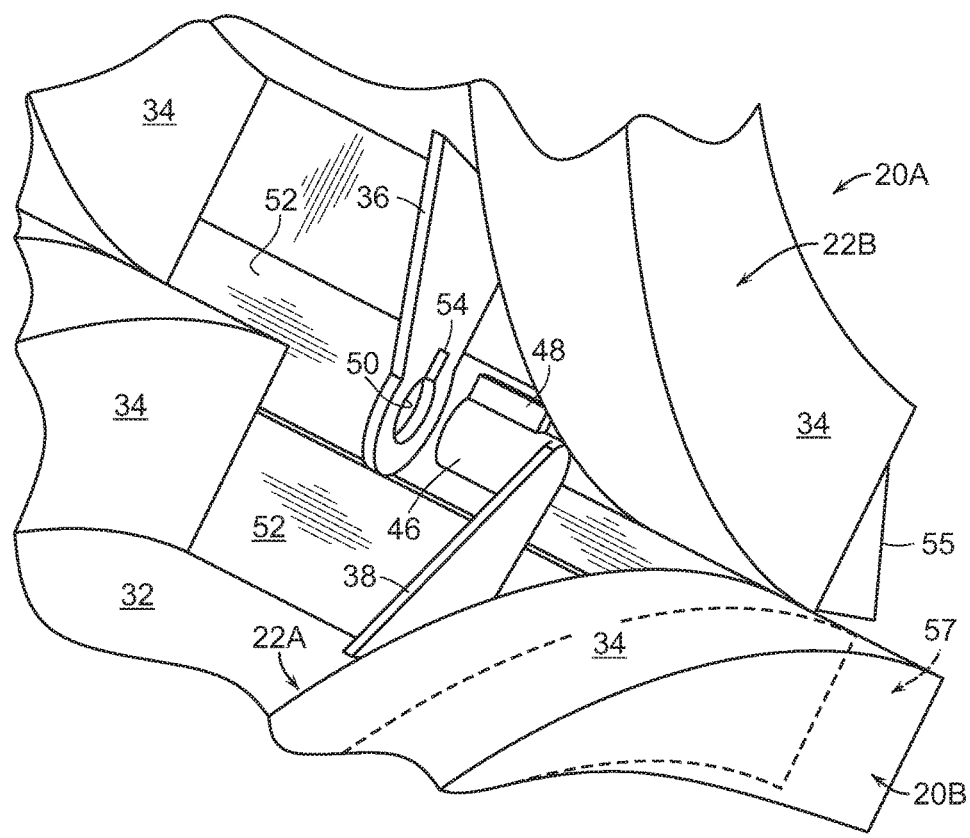
FIG. 12 is a close up view of one of what is shown in FIG. 11.

FIG. 9-12 illustrate features to the joint which is formed between embodiments of half chambers. FIG. 9 is a perspective view looking down at the top of a single half chamber 22A which is representative of the two identical half chambers 22A, 22B. For clarity, FIG. 9 is a simplified view in that strengthening panels 52 described in connection with FIG. 11-12 are omitted and there are no individual stirrup plates; there is only a vertical flange 45 at the top of the half chamber. The exterior surface of the top of half chamber 22A is characterized by hinge parts 36, 38 that are located within valleys 32. There are two kinds of hinges: essentially male hinge parts 38, e.g., comprising pintles 46 as shown in FIG. 10C, and essentially female hinge parts 36, e.g., comprising gudgeons 50 as shown in FIG. 12. The gudgeons are shaped to receive the pintles. Preferably hinge parts 38 alternate with parts 36 along the length of the half chamber top which forms half of the joint in a whole chamber.

FIG. 11 shows how a joint is formed between two closely positioned half chambers. The two half chambers are shown in a position where they are ready to be moved lengthwise relative to each other so the hinge parts 36, 38 mate. FIG. 12 is an expanded view of what is shown in FIG. 11; it shows in more detail the longitudinally engageable hinge parts. FIGS. 11 and 12 show how pintle 46 of hinge part 38 is shaped to enter the gudgeon 50 of hinge part 36 when the half chambers 22A, 22B are placed in close proximity and when the half chamber 22B is moved lengthwise, as indicated by the arrow T in FIG. 11.

Pintle 46 of hinge part 38 preferably has an integral lengthwise-extending key 48 on its exterior. See FIG. 12. The key is shaped to enter the slot 54 associated with gudgeon 50. When key 48 passes through the slot 54 of hinge part 36, and half chamber 22B (and thus hinge part 36) is rotated relative to half chamber 22A (and thus relative to hinge part 38), pintle 46 is captured lengthwise within gudgeon 50 because key 48 prevents disengagement so long as the key is not aligned with slot 54.

Thus, from the foregoing it will be understood why, as described above for FIGS. 1-4, the half chambers can be engaged with each other when in a particular greater-than-180 degree angle M chord orientation, namely, because the key 48 and slot 54 are aligned in that position. When the half chambers are rotated about the hinge connection so the angle M nears 180 degrees or is less than 180 degrees, the half chambers cannot disengage from each other because the keys of the pintles do not line up with the slots of the gudgeons. As an example, the hinge parts may be engaged and disengaged other only when the angle between the chords is about 210 degrees. In the generality of the invention, other go/no-go angles M may be chosen, for example to address a circumstance where the chambers are stacked in other than flat (180 degree chord angle M) position, such as being stacked with angle M of 150 degrees. To re-articulate generally the foregoing construction of chamber comprised of half chambers and its features: There is a critical value X of angle M between the chords of the half chambers. (In the foregoing examples, X=150 degrees and X=180 degrees.) When angle M is greater than X, the chambers are longitudinally engageable and disengageable at the hinge parts. When angle M is less than X, the chambers cannot be engaged or disengaged.

Other means than a key may be used to limit engagement-disengagement to a particular angle M. For example, the pintle may have an outer end which is irregularly shaped with portions that are larger than the diameter of the rest of the pintle, and the gudgeon opening may fit that irregular shape.

In another embodiment, the means for preventing relative lengthwise motion of mated half chambers can be unassociated with the hinge itself. For instance, a tab can project from one half chamber in vicinity of the joint, remote from the hinge, to engage a feature on the mating half chamber when the chord angle is about 180 degrees or less, or to engage at all angles. For example, a latch of the type described below in connection with FIG. 15 can be used to limit lengthwise motion. In still another embodiment of the invention, there is no means for limiting disengagement; rather care is taken during handling not to move the half chambers lengthwise.

In the generality of the invention, half chambers may be hingedly connected to each other without a construction which dictates a critical go no-go angle M. Lengthwise-motion locking means for pintle and gudgeons may be employed. For example a pin may be put into a diametrical hole at the end of pintle 46 after the half chambers are mated; a snap-ring may be placed within a groove formed at the outer end of pintle 46, and so forth. A pintle may be given an arrow shaped head, the base of which is slightly larger than the opening of the gudgeon; so when the head is resiliently forced through the opening, the reverse motion is prevented in the absence of great force or a special tool. In carrying out the invention, separately formed hinge parts made of metal, plastic, or other material may be molded-into one or both half chambers, or attached to a half chamber after molding, as by means of fasteners or welding.

In the generality of embodiments of the present invention, the term hinge (and variants) encompasses any kind of mechanical connection between the top portions of the half chambers that enables relative pivoting of the half chambers in the transverse vertical plane of the chamber. A hinge in embodiments of the present invention does not provide continuous material connection between the chambers, as does a living hinge.

FIGS. 10, 10A, 10B, and 10C illustrate other features of the joint at the top of a chamber 20, namely stirrup plates 40. Stirrup plates 40 are substantially vertical lengthwise structures which are attached to upper end of a half chamber corrugated sidewall and to ribs 26 which run in valleys, transversely on the concave interior surface of the half chamber sidewall. As shown in FIG. 9, each stirrup plate 40 has a plurality of essentially semi-circular cylindrical arches or stirrups 41 which run parallel to the half chamber length axis and are spaced apart from each other by slots 43. Slots 43 of one half chamber are shaped to receive the stirrups 41 of the mating half chamber. While the stirrup plate 40 illustrated in FIG. 10 and FIG. 10 C is continuous along the length of the half chamber, in an alternative embodiment a multiplicity of smaller stirrup plates are spaced apart along the length of the joint.

FIG. 10A is a schematic end view illustrates the rotational mating motion of stirrup plates 40 of one half chamber with the stirrup plates 140 of an identical half chambers, as one stirrup plate 140 is being rotated about hinge axis PP, as indicated by the arrow, to approach the another.

Figure 6:
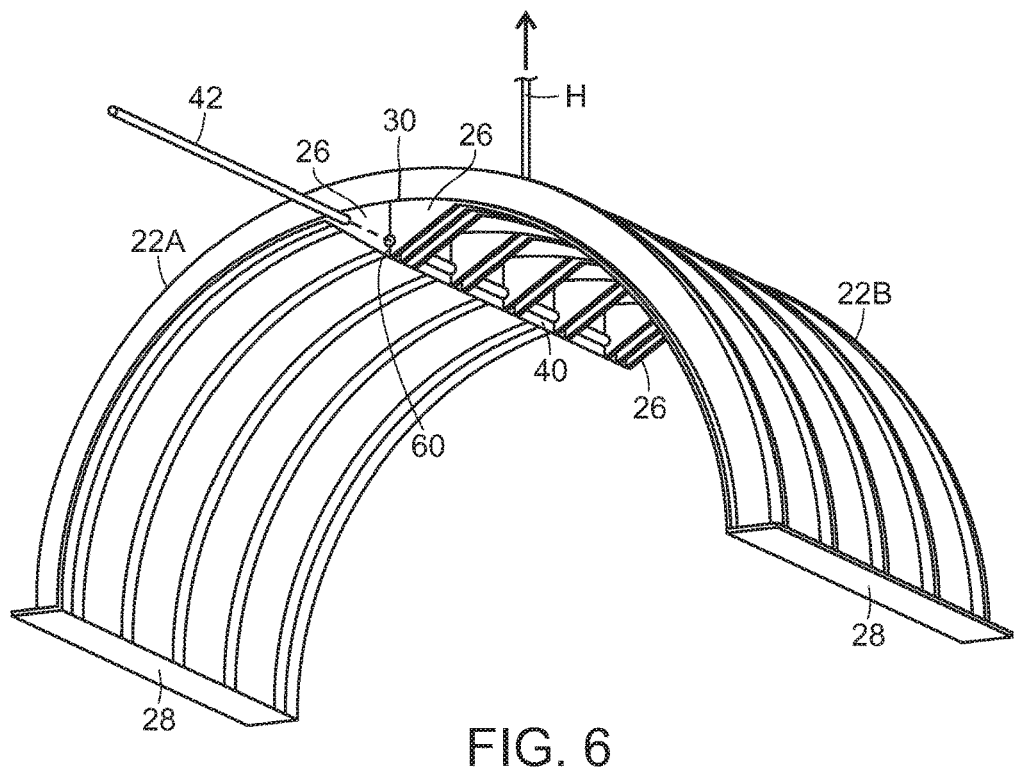
FIG. 6 is a view like FIG. 5, showing a locking rod lengthwise in exploded fashion, for locking together mated half chambers so they will not splay apart.

FIG. 10B shows the plates 40, 140 as they have completed the rotation shown in FIG. 10A, thus reflecting their respective orientations when two half chambers are in the chamber use configuration. The plates 40, 140 cannot go further toward each other than is shown in FIG. 10B because vertical running portions of the plates, away from the stirrups and slots, contact each other. When a chamber is in its use configuration, the mated semi-cylindrical arches (stirrups) of the stirrup plates 40, 140 define a lengthwise passageway 61. The plurality of passageways 61 align with preferred 60 in the ribs 26 at the ends of the chambers. As illustrated in FIG. 6, a locking rod 42 is slidable lengthwise through holes 60 and passageways 61, to effect locking of the mated plates 40 and to prevent the half chambers from separating.

When a chamber 20 is vertically loaded during use, as by the weight of overlying crushed stone or earth or pavement, etc., a bending moment can arise in vicinity of joint 30. One effect would be to separate the plate 40 on one half chamber from the plate 140 on the mated half chamber, i.e., the joint could tend to open and the top could be prone to move downward. Such a tendency is resisted by the engagement of plates 40, 140 with locking rod 42.

FIGS. 10C, 11 and 12 show a half chamber embodiment 22B having vertical plates 52 at the upper ends of the valleys 32. This compares with the FIG. 9 half chamber embodiment 22A, where there are no plates. A plate 52 can be characterized as vertical upward extension of a stirrup plate. Or plates 52 can be characterized as a top flange when there are no stirrups. Plates 52 connect adjacent peak corrugations 34 for further joint strength. The presence of plate portions 52 also provides a structure to which may be attached the vertically extending portions of hinges parts 36, 38. More strength and stiffness is provided to a chamber.

FIG. 10C and FIG. 12 show optional pyramidal dowels 55 which project outwardly from the ends of peak corrugations 34. Dowels 55 are received in cavities 57 which comprise the underside of peak corrugations of the mating half chamber. See FIG. 12. Not shown in portion of the exemplary half chamber pictured in FIG. 10C is that the half chamber 22B has a total of four peak corrugations 34. The other two peak corrugations which are not shown have no dowels; rather at those other peak corrugations there is an opening 57 in the plate 40. Thus, when identical half chambers are mated and rotated to form the desired arch shape cross section of the chamber in its use configuration, each dowel is aligned with, and is received within, an opening 57 in the plate 40, which opening 57 is to the half chamber concave interior and which opening underlies the peak corrugation on the mating half chamber. Dowels 55 and associated receiving-cavities 57 can provide further strength to the joint. In an alternative embodiment chamber, dowels present in pairs as just described.

Figure 13:
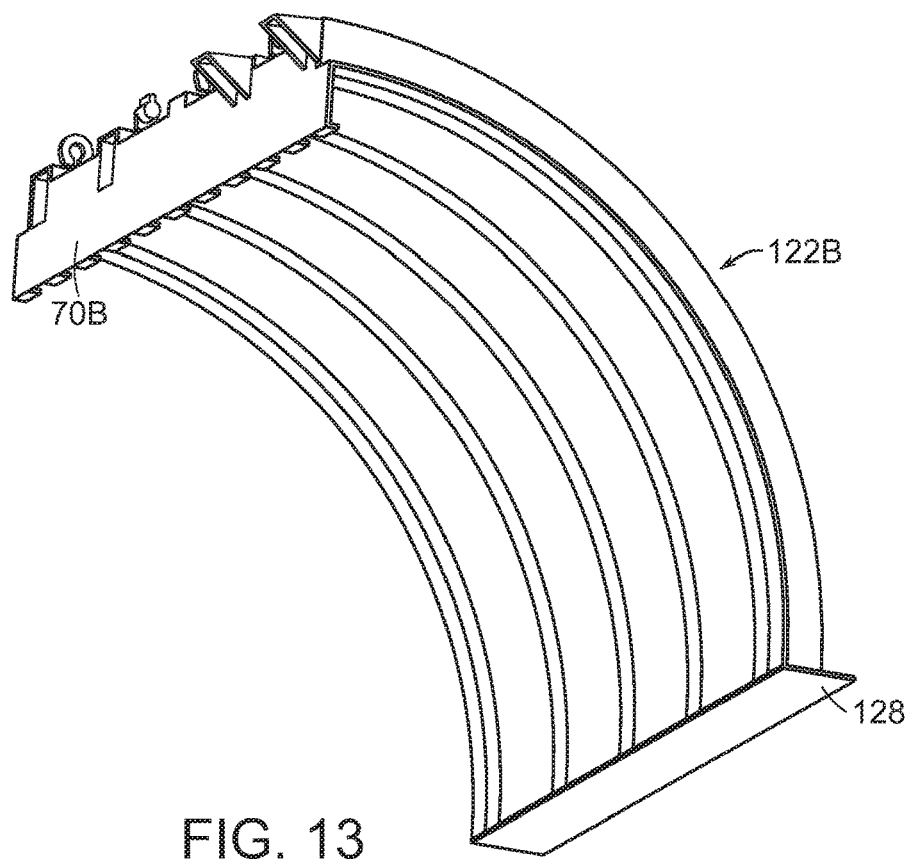
FIG. 13 is an end perspective view looking up into the concavity of a half chamber which has a lengthwise L shape top flange with serrations.

In other embodiments of the invention, different means than stirrup plates and rods can be employed to lock together and or strengthen the joint. An example is illustrated in FIGS. 13, 13A, 13B and 14. FIG. 13 shows half chamber 122B having base flange 128 and a top flange 70B which is L-shape in the vertical cross section plane of the chamber.

Figure 13A:
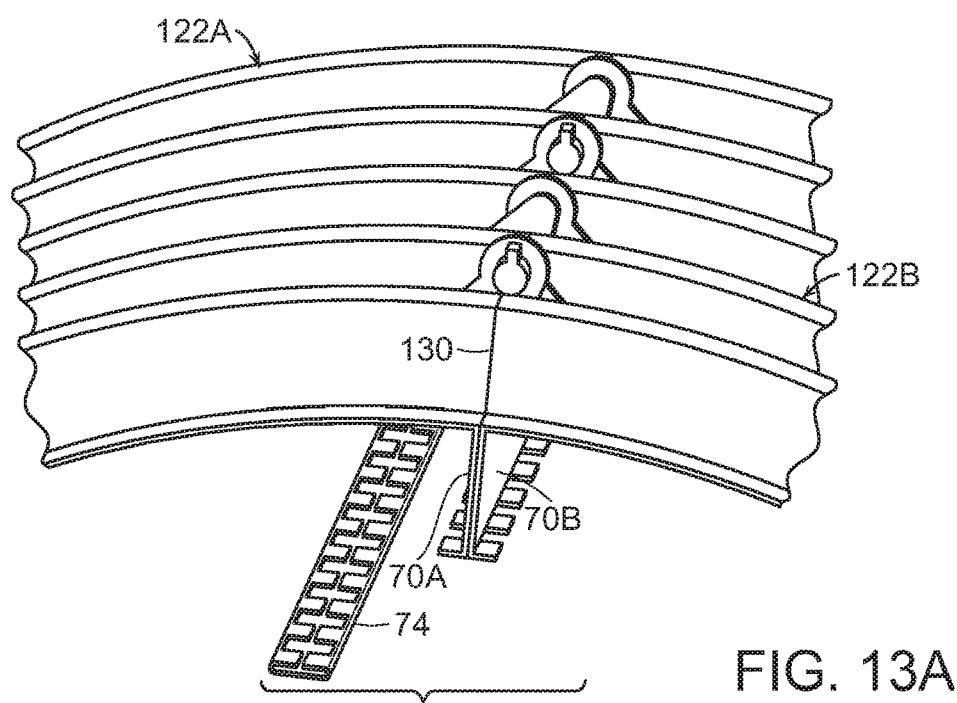
FIG. 13A is a perspective view of two mated half chambers like those shown in FIG. 13, along with an associated serrated C shape channel.
Figure 13B:
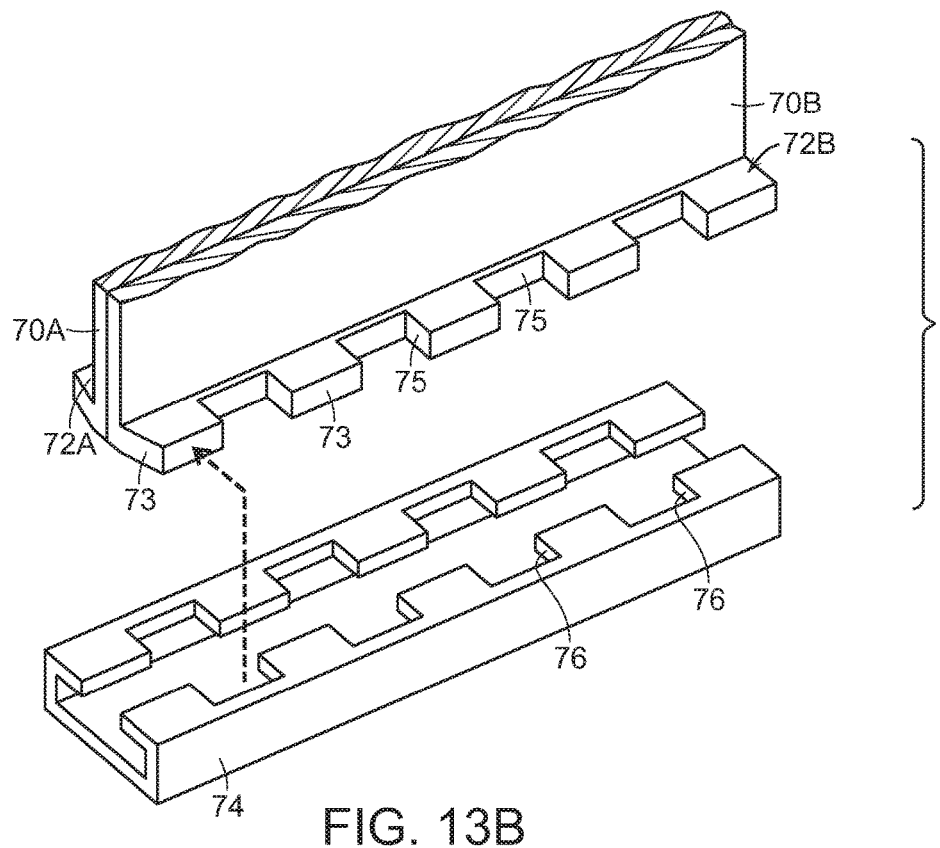
FIG. 13B is a perspective view of the portions of mated L shape top flanges of the half chambers of FIG. 13A,
showing how the serrated C shape channel engages serrated portions of the L shape top flanges.
Figure 14:
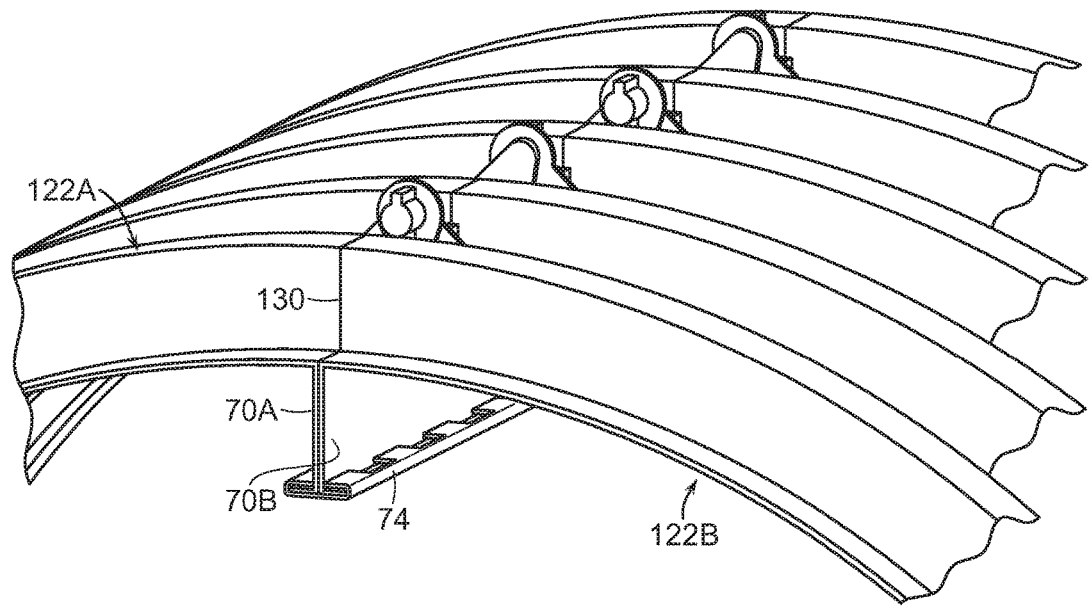
FIG. 14 is an end perspective view of the half chambers shown in FIG. 13A, showing a serrated C shape channel in place, to hold the chambers from hingedly moving apart.

FIG. 13A shows two identical chambers 122B and 122A (each having a respective L-shape flange 70B, 70A) which a mated as part of top joint 130. C shape cross section channel 74, a clamp, is shown in proximity to the joint. In one embodiment, shown in FIG. 19 and discussed below, the horizontal flange portions 72A, 72B are continuous and the clamp 74 slides onto them by moving lengthwise. Portions of the preferred embodiment of FIG. 13A are shown in more detail in FIG. 13B. FIG. 14 shows the clamp in its final use position. The horizontal portion 72B of typical L-shape flange 70B is comprised of spaced apart cutouts 75. In another way of looking at it, the horizontal portion comprises spaced apart tabs 73. Clamp 74 has cutouts 76 which, when aligned with the tabs 73 of the flange, enable the clamp to be moved vertically so the tabs are contained within the concavity of the clamp. Clamp 74 may then be moved lengthwise along the chamber for a distance nominally equal to the length of one tab. That results in the clamp being captured on the L shape flanges, and opening of the joint at the hinge point is inhibited. Some bending moment resistance will be imparted.

Figure 15:
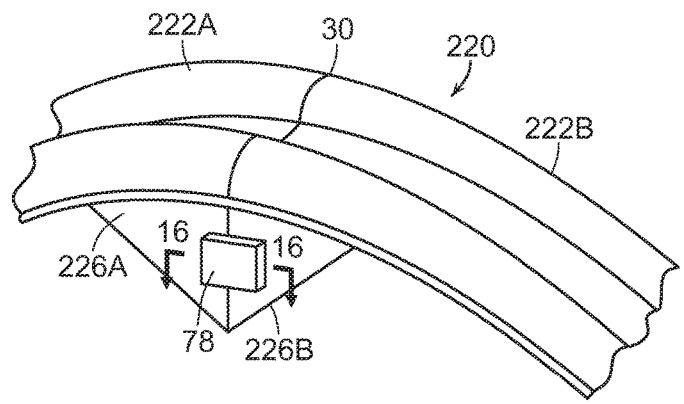
FIG. 15 is an end perspective view of a portion of the top of a hinged joint chamber, showing a latch at the end of the chamber.
Figure 16:
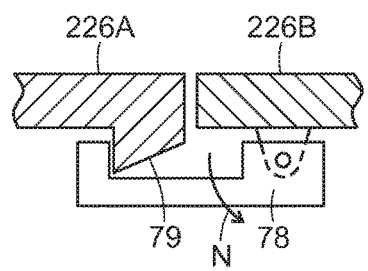
FIG. 16 is a horizontal plane cross section through the latch location of the chamber portion shown in FIG. 15.

In another embodiment of the invention, other features are used to hold the half chambers together at the joint so they can be handled, and to allow installation of other securing means such as a locking rod 60 or a clamp 74. FIG. 15 and FIG. 16 show a portion of the end of a hinged-joint chamber 220 which comprises mated half chambers 222A and 222B. A latch 78 engages a match plate 79, and holds the joint 230 together. Latch 78 is shown as a hinged or swinging arm; a latch with a living hinge or spring action may alternately be used. A hook and loop fabric latch may be used.

Figure 17:
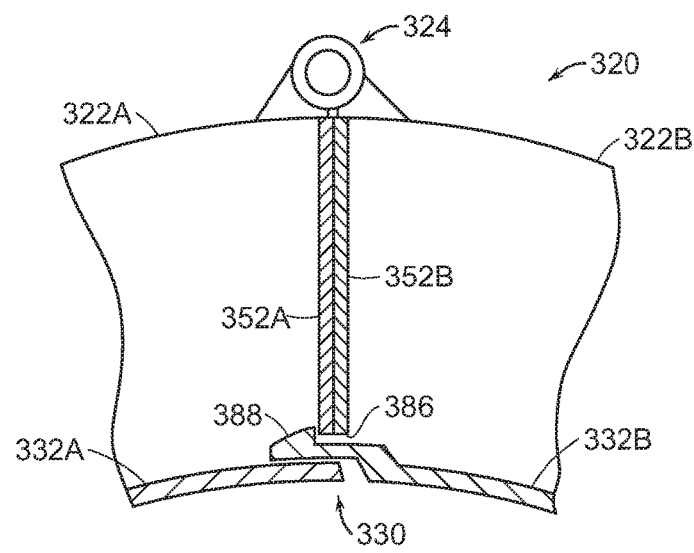
FIG. 17 is a transverse vertical cross section view through the valley portion of a chamber comprised of two hinge-connected half chambers, showing a latch in the valley.

Still other substitutional mechanisms for holding the joint together, with like function and effect to those described above, may be used. FIG. 17 is a partial vertical cross section of chamber 320 having hinge connection 324 and top joint 320. Mating plates 352A, 352B close the ends of valleys 332A, 332B. Tab 388, which extends from valley 332B of half chamber 322B, passes through slot 386 in the plates, when the half chambers are pivoted about hinge point 324, to put the chamber in the use configuration. The arrow shape head 388 and elastic action of the body of the tab act to hold the plates together, and thus to keep the joint closed.

Figure 18:
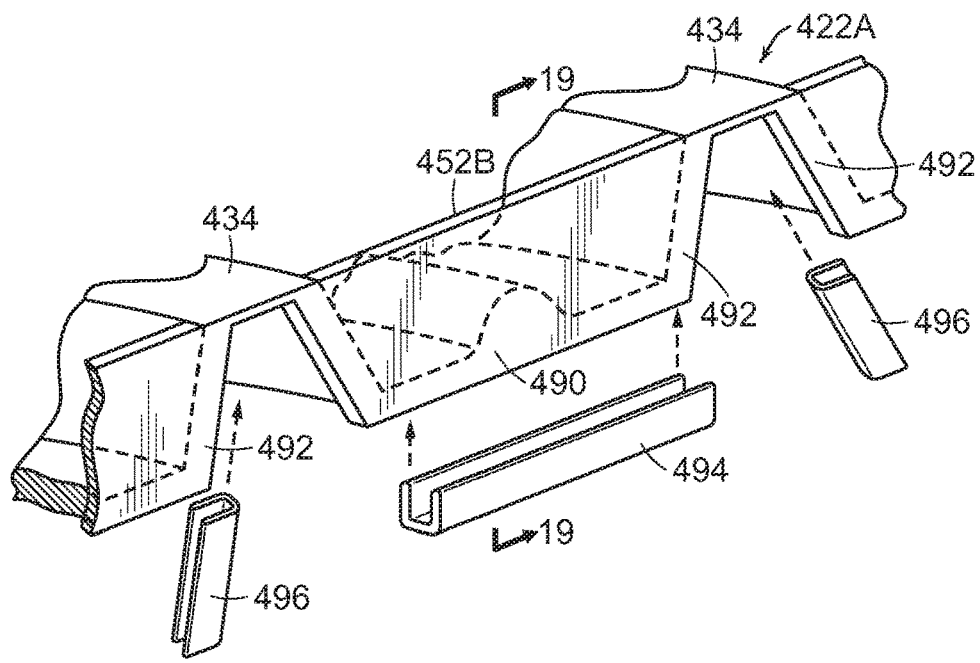
FIG. 18 is a perspective view of the top portion of a half chamber along with associated clamps (in exploded position) which hold vertical plate portions of the half chamber to the corresponding portions of an identical chamber.
Figure 19:
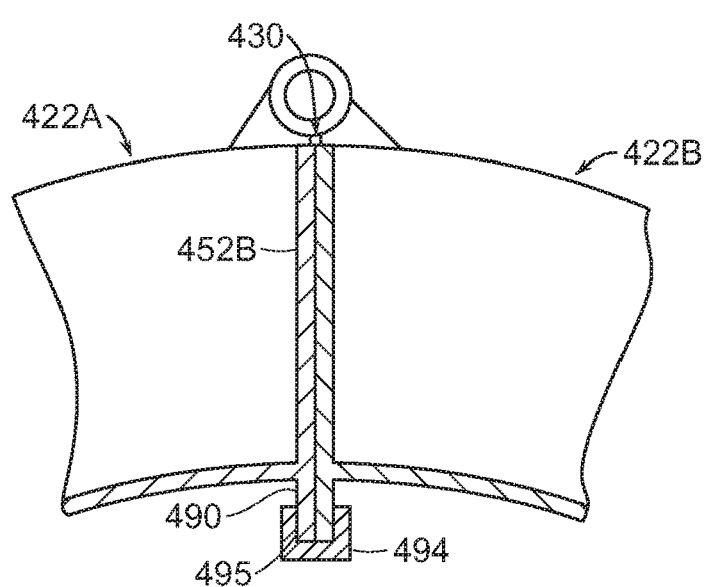
FIG. 19 is a transverse vertical cross section view of the joint region of a chamber comprised of two mated half chambers like the half chamber of FIG. 18, along with a clamp in its use-position.

The perspective view of FIG. 18 and the related vertical cross section view of FIG. 19 show still another embodiment of means for holding the joint of mated half chambers together. Half chamber 422A mates half chamber 422B at joint 430 as illustrated in the chamber fragment shown in FIG. 19. FIG. 18 shows one half chamber 422A. An identical mating half chamber is omitted from FIG. 19 for clarity, but can be imagined. Flange 452B runs lengthwise along the top end of typical half chamber 422A. Flange 452B has vertical lip portions 492 which extend into the interior concavities of the peak corrugations 434. The lip portions 492, when mated with the corresponding lip portions of a like chamber, are engaged by resilient-material clamps such as clamp 494, shown in exploded position in FIG. 18. In like fashion, flange 452B also has a downward extending portions 490 which, when mated with the corresponding portions of a like half chamber, as shown in FIG. 19, is engaged by C shape clamp 494. As shown in FIG. 19, a portion 490 preferably is L shape, comprising a ridge 495. And, clamp 494 is C shape, to engage the ridge, to help hold the clamp in place. Like ridges may characterize the lips 492 and associated clamps 496.

In still other embodiments of chambers of the present invention, screws, bolt fasteners or welding, may be used in addition to or in combination with one or more of the features described here, to hold hinged half chambers together. See the features of a welded and bolted joint, including joint interlocking and strengthening features described in related commonly owned U.S. Pat. No. 9,016,979 issued Apr. 28, 2015 and entitled "Plastic stormwater chamber made from separately molded half chambers. The disclosure of said patent is hereby incorporated by reference.

Preferably, the half chambers are identical, as has been described. In another embodiment of the invention, one half chamber may be different from the other half chamber. For example, the hinge parts on a first kind of half chamber can be all of the male (pintle) type and the hinge parts on the second kind of half chamber can be all of the female (gudgeon) type. However, that eliminates an advantage of using the same mold for both parts; and it may be necessary to accumulate and keep on hand an inventory of first kind of half chambers, to await the change of mold required to manufacture the second kind of half chambers. The aforementioned advantage of avoiding shrinkage problems will be lost.

From the foregoing description of half chambers and resultant whole chambers, it will be appreciated that, by example, if there is a transverse projection at the joint at a first end of a half chamber, that same half chamber has to have a cavity at the other end to receive the projection when two hinged half chambers are placed in the use configuration. Thus, along the length of a half chamber there cannot be symmetry about the mid point of the length of the half chamber.

However, using one mold to make mating identical half chambers presents a problem with respect to how to enable a familiar kind of overlap connection between chambers when they are connected end-to-end to form a string of chambers. In a typical prior art one piece chamber there is a corrugation at one end which is smaller (or larger) than the corrugation on the other end of the chamber. Thus, one chamber, oriented correctly, can overlap, or be overlapped by, another identical chamber.

But when a whole chamber is comprised of two mated identical half chambers that have been formed in exactly the same mold, then the corrugation at one end of a half chamber cannot be smaller than the corrugation at the other chamber end. The reason is that when a half chamber is rotated in space relative to the other half chamber, to make the joint between two half chambers, any smaller or larger dimension corrugation at the first end of a first half chamber will align with, and not mate dimensionally with, a standard size corrugation at the second end of the mated identical half chamber.

The compliant nature of plastics means that in one embodiment of the invention an overlap joint might be made between chambers of the present invention which have the same dimension corrugations at each end. The corrugation at the end of one chamber is laid upon the identical shape corrugation at the end of the mating identical chamber. However, some can see that as an imperfect joint because of the interference-fit at the joint, owing to the effect of the wall thickness of the chamber.

Methods for manufacturing by injection molding mating half chambers will now be described which address the foregoing problem. While the manufacturing methods are described in connection with half chambers used in constructing a hinged chamber of the present article invention, the methods may also be used for the chambers of the aforementioned commonly owned U.S. Pat. No. 9,016,979 and potentially for other articles which have corrugations.

Figure 20:
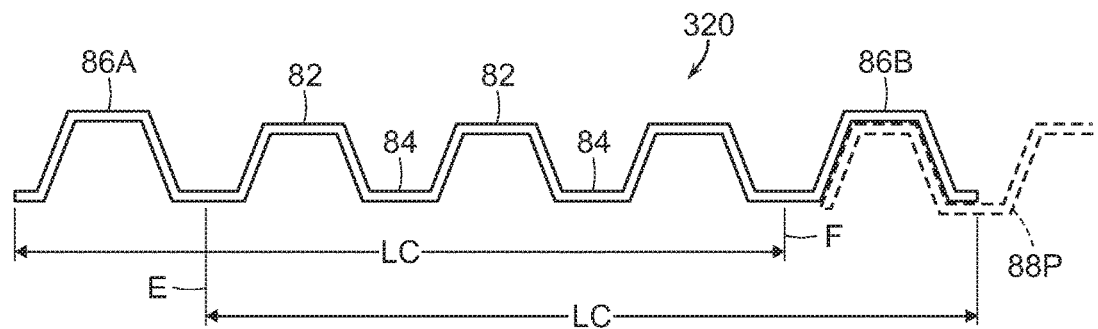
FIG. 20 is a lengthwise cross section through the wall a half chamber precursor, illustrating how alternate ends of the precursor are severed to produce first and second half chambers which mate with each other to form a chamber having a larger peak corrugation at one end.

A first embodiment and second embodiment of the method invention is described. In each a half chamber precursor is molded, and is then cut to make a half chamber. The first embodiment is illustrated in FIG. 20 which shows the cross section of a half chamber precursor 320, as molded, looking into a lengthwise plane, e.g., adjacent the joint region. In the center portion of the part 320 are peak corrugations 82 and valley corrugations 84 which have what is called here standard size. At each end of the chamber are peak corrugations 86A, 86B which are larger than the standard size corrugations, sufficient to overlap a standard size corrugation. The nature of the overlap by peak corrugation 86B of the end of portion of phantom chamber 88P having standard size corrugations is illustrated at the right side of FIG. 20.

Cut lines E and F are shown in FIG. 20. To make a first kind of half chamber, a first precursor 320 is cut at line F, thereby to produce a first half chamber having a length LC and a large peak corrugation 86A at the left end, as shown in the Figure. Next, a second precursor 320 is molded and it is cut at line E, to thereby produce a second half chamber also having length LC and a large peak corrugation 86B at the right end of the half chamber, i.e., the opposite end of the first half chamber which was fabricated by cutting. The cut portions are discarded. Thus, when the first and second half chambers are rotated in space and mated to make a joint, the two larger peak corrugations 86A, 86B mate with each other; and, the resultant chamber has a large corrugation at one end, suited to overlap the standard corrugations at the other end of a like chamber, which other end comprises what were the cut-ends of the precursors.

Figure 21:
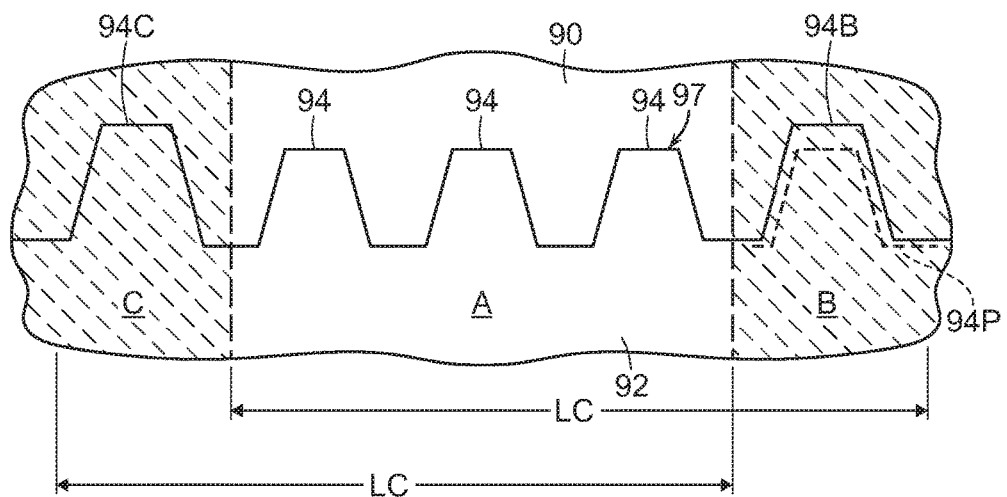
FIG. 21 is a cross section through an injection mold cavity showing how, by inhibiting plastic flow to a portion of the mold, a half chamber may be made which has a standard corrugation at one end and a larger corrugation at the other end.

The second embodiment is illustrated by FIG. 21 which is a cross section through an almost schematic two part injection mold comprised of upper part 90 and lower part 92. The mold is shaped to make a chamber part 97 (which illustrated by only a single line for simplicity). The mold has end portions B and C, connected by center portion A. The mold end portions B and C are shaped respectively to form a corrugation 94B, 94C which is larger than the standard size peak corrugations 94 which are formed by the center portion A of the mold.

A phantom standard corrugation 94P is shown at the right of FIG. 21, to show how it may be overlapped by a large corrugation 94B. To make a first half chamber, the flow of plastic to mold portion C is shut off during molding. Known appropriate kinds of shut-offs and flow control devices for injection molding are used. Thus, a first half chamber having a length LC and a large peak corrugation 94B at one end, formed by portion B, is produced. Next, a second half part is formed by shutting off flow of plastic to mold portion B during injection molding. That results in a second half chamber which also has a length LC, but now with a large peak corrugation 94C at one end, being the opposite end from that of the first half chamber having peak corrugation 94B. Thus, the first and second half chambers can be mated at a lengthwise joint at their tops and to form a chamber having a large peak corrugation comprised of mated features 94B and 94C at one end, while the other end of the chamber (and the middle) has a standard size corrugation comprised of mated peak corrugations 94.

Figure 22:
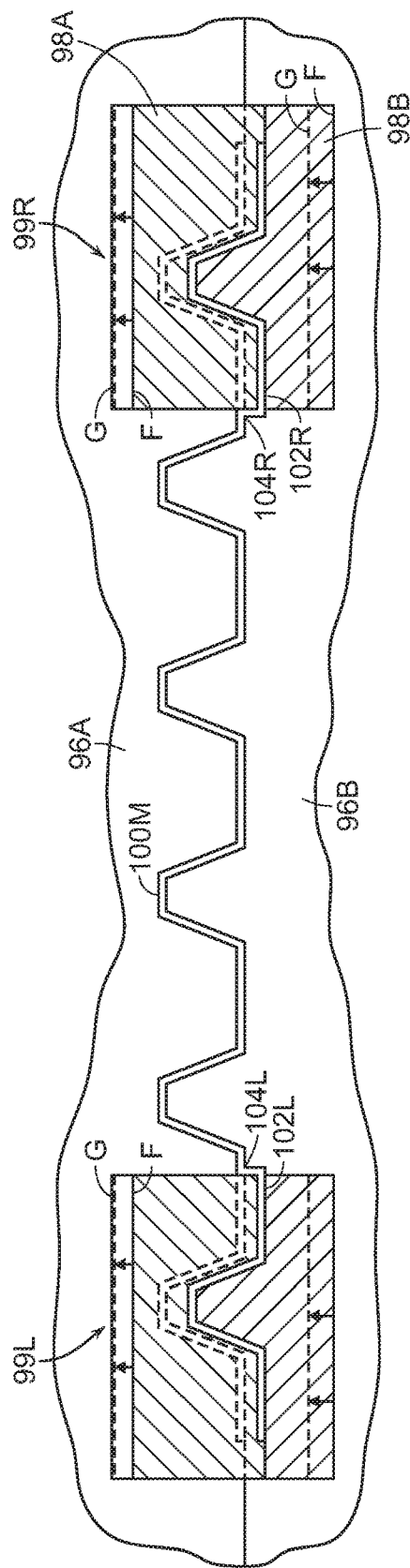
FIG. 22 is a cross section through a mold having movable inserts at each end of a mold cavity.
Figure 23:
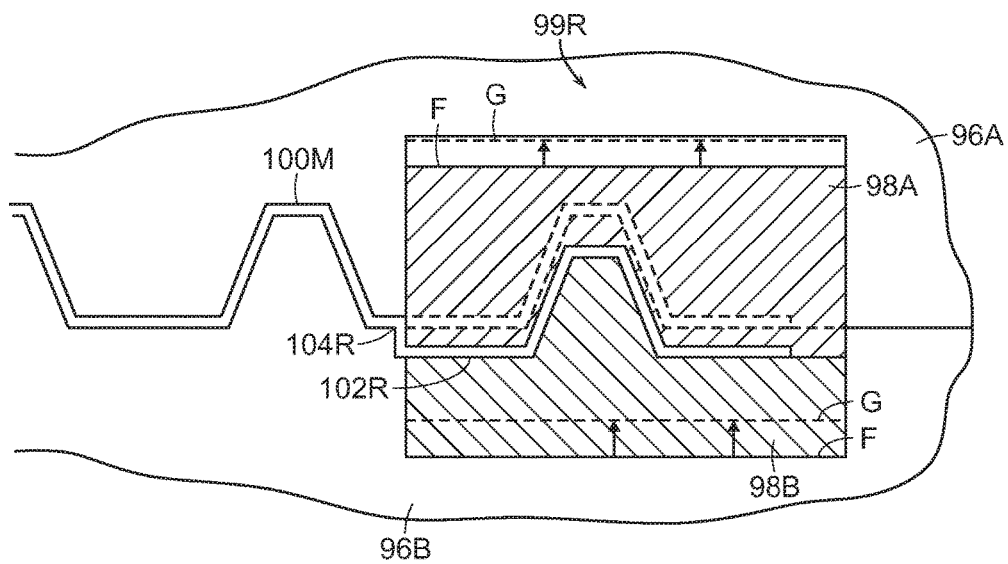
FIG. 23 is a detail view of one end of the mold shown in FIG. 22.
Figure 24:
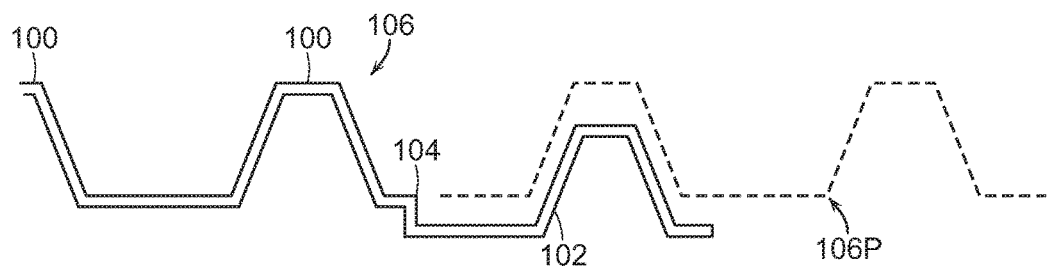
FIG. 24 is a partial schematic cross section of an end of a first half chamber made in the mold of FIG. 22, along with a phantom of the opposite end of a like half chamber.

In a third embodiment of method for making chambers suited for overlapping, there are moving parts within the injection mold. After a first part is made, the internal parts of the mold are re-positioned so the size of the second part has corrugations at each end which are different from those of the first part. This is illustrated by FIG. 22-24. FIG. 22 is a schematic cross section of a portion of an injection mold having interconnected cavities which define a corrugated half chamber. The mold is configured to produce a half chamber which has standard corrugations along the preponderance of the chamber length, and a smaller peak corrugation at one end. At each end of the mold cross section are mold subassemblies 99L and 99R which contain moveable inserts. Each insert moves from a first position F to a second position G. The movement takes place in the interval between a first injection mold shot which forms a first half chamber and a second shot which forms a second half chamber.

In the first shot, the inserts, e.g., inserts 98A, 98B of subassembly 99R, will be at position G and the inserts of the other subassembly 99L will be at position F. In the second shot, inserts of subassembly 99L will be at position F and inserts of subassembly 99R will be at position G. The result will be that a first half chamber will be formed with a small peak corrugation at one end (that defined by cavity 102L of subassembly 99L), and a second half chamber will be formed with a small peak corrugation at the opposite end from that of the first chamber, that defined by cavity 102R of subassembly 99R. Each chamber will have standard peak corrugations along the rest of the length of the chamber. Thus, when the two different half chambers are mated, the smaller corrugations mate with each other and provide a chamber having a standard peak corrugation at one end and a smaller peak corrugation at the other end.

In further explanation: FIG. 23 is a detail view of the portion of the mold having subassembly 99R; it is typical of the subassembly 99L in FIG. 22. The mold comprises two mold parts 96A, 96B which define interconnected mold cavities 102L, 100M and 102L. Contained within the mated mold parts is subassembly 99R, the moveable inserts 98B, 98A of which define mold cavity 102R. (At the other end of the mold, subassembly 99L has corresponding parts and defines cavity 102L.) The inserts of the two subassemblies 99L, 99R are movable in the vertical direction, under action of unshown but conventional actuation means, in coordination with each other, and in simultaneous opposite directions. The inserts move from a first position F to second position G as indicated by the small arrows in FIG. 23. The inserts define mold cavity 100R. The cavity 102R which the inserts 98A, 98B define is connected to the middle cavity 102M at point 104R.

The first shot, with the slide assembly 99R in position F as shown in FIG. 23, and the slide assembly 99L in position G, produces a part 106 like that shown in FIG. 24. The major part of the half chamber has standard corrugations 100, while the end corrugation 102 which was formed in the slide assembly 99R is smaller. There is a jog at point 104 where the corrugation 102 connects to the rest of the half chamber. In FIG. 24 the end of the half chamber which is opposite to the end 102 of a like half chamber, namely chamber 106P, is shown in phantom, to illustrate how its standard size corrugations overlie the end 102.

Figure 25:
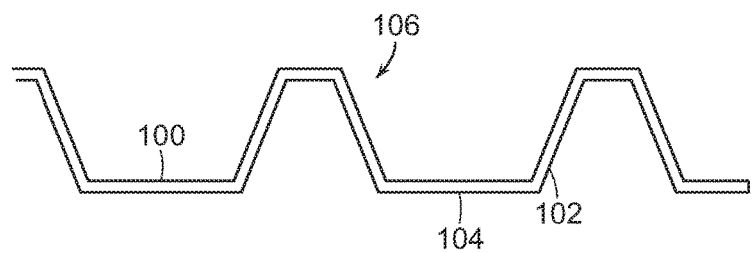
FIG. 25 is a partial schematic cross section of the end of a second half chamber made in the mold of FIG. 22, after the mold inserts have been re-positioned.

For the next shot, the slide 99R is then moved to position G and the inserts of subassembly 99L are moved to position F. Plastic is injected into the mold to form a second half chamber which will have an end 102 shaped like that shown in FIG. 25. There is now no jog at connection point 104. The opposite end (not shown) will have a small corrugation defined by mold cavity 102L.

Thus, when the first and second half chambers are mated at their top joint, the small peak corrugations of the first and second half chambers match with each other and the standard corrugations at the other ends match each other. Thus an arch shape cross section chamber having a first end which can be overlapped by the corrugation at the other end is formed.

All of the foregoing three embodiments may be carried out in alternative fashion by (a) substituting a valley corrugation for a peak corrugation at the end of the half chamber and chamber; or (b) making the sense of the end corrugation opposite to what has been described, i.e., substituting a larger corrugation for a smaller corrugation or vice versa.

The following describes how a chamber may preferably be formed by fusion welding in vicinity of the hinge joint between mated half chambers: a fusion weld element is caused to melt by means of electric resistance heating or electromagnetic induction heating. The melting takes place while the hinged-together half chambers are being thrusted or pulled upwardly in vicinity of the hinge location, so they move from a splayed out configuration to a use configuration, as illustrated by FIG. 7. As described previously, the weight of each half chamber (force of gravity) causes the hinge joint to close. Thus, when a fusion weld element which is captured in the joint melts, the half chambers will rotate a small amount relative to each other, to deform the element and more fully close the joint. In this portion of the description, the mating surfaces proximate the tops of the half chambers are sometimes referred to as faying surfaces.

A preferred method of welding by using an electrically heated weld element captured within the joint is described in commonly owned patent application Ser. No. 14/809,124 of R. Moore and P. Holbrook, filed Jul. 24, 2015, entitled "Plastic tank having fusion welded parts" (the "'124 application"), now U.S. Pat. No. 9,840,040. The disclosure of said application is hereby incorporated by reference. The preferred method of using a fusion weld element is particularly useful when half chambers are permanently fastened to each other at a location remote from the original manufacturing facility. In the generality of this method-of-forming invention, other means for welding may be used. For instance, familiar welding by use of hot air and filler rod, or hot plate welding, may be used.

A fusion weld element as the term is used here refers to a component which can be heated by electrical or electromagnetic energy, sufficient to cause localized melting and fusion of both the element and the local plastic material of the parts being joined. Exemplary fusion weld elements comprise plastic with embedded metal pieces that are heated by electric resistance or electromagnetic induction are described further below. Some commercial products are described below.

Placement of a fusion weld element may be accomplished in different ways. For example, the fusion weld element may be molded into the material of the half chamber when it is formed, as suggested by illustration in the related '124 application. Alternately, the element may be placed partly or wholly within in a groove on one of the faying surfaces; alternatively, the element may be simply captured between the faying faces as they are pressed toward each other. Preferably, in the present invention, the latter technique is used and a fusion weld element is plastic-tack welded to a faying surface. As the faying surfaces are moved toward each other, the fusion weld element is raised in temperature sufficient to melt the fusion weld element and local portions of the mating plastic surfaces. The application of electric energy is then ceased and the weld zone is allowed to cool. The resultant solid weld joint is fused plastic which weld-joins the two parts. Some metal artifact from the metal portion of the fusion weld element may remain within the fused plastic weld material. A fusion weld element may be placed on one of the faying surfaces, alternately an element may be placed on each faying surface.

FIG. 26 is a perspective view of the top portion of a lengthwise portion of half chamber 522A. Half chamber 522A is generally like half chamber 22A that is shown in FIG. 9. The corrugated half chamber has peaks 534 alternating with valleys 532. A smaller peak corrugation 534A is at the end of the chamber for better overlap of the end corrugation of a like chamber. A combination of female hinge elements (pintles) 536 and male hinge elements (gudgeons) 538 extend from tops of the peaks. The elements 536, 538 are shaped to mate male-female with the like elements of a mating half chamber. The joint surface 540A, which is also the faying surface with respect to welding, has a fusion weld element running along the surface. The fusion weld element generally follows the peak and valley contour of the upper edge of the faying surface of the half chamber, and the contour of the lower edge of the faying surface. Alternative fusion weld element paths may be used. The terminal ends 81T of a resistance heated type of fusion weld element extend from the joint at the end of the chamber (not shown) so they may be connected to an electric power supply. While FIG. 26 shows one continuous faying surface 540A and a fusion weld element that predominately runs lengthwise with respect to the chamber length, in other embodiments of the invention there may be a multiplicity of spaced apart faying surfaces with an integral weld element running between them, or with separate weld elements associated with each.

FIG. 27 is a vertical cross section through half chamber 522A, showing how the fusion weld element 81 lies on the surface 540A, being plastic-tack welded to the surface. In an alternative embodiment, two parallel spaced apart fusion weld elements will run along the path of the single element shown in FIG. 27. That may be accomplished by providing a U-shape element prior to the tack welding step. The fusion weld element is preferably tack welded to the faying surface before the hinged-together chamber is shipped from the factory, that is, after molding or after the half chambers are mated for putting on a shipping pallet.

FIG. 27 also shows in phantom a mating half chamber 528B, and by dashed arrow H, shows how an upward force is applied to the tops of the half chambers at the joint location. The upward force may be applied either by means of a lanyard as shown in FIG. 7, or by means of a fixture which pushes upwardly from beneath the chamber, or by up-thrusting or rotational forces applied to the base flanges, or by other logical means within the ordinary skill. Preferably, the upward force is applied to the hinge joint region and force of gravity will cause the half chambers to rotate toward each other as indicated by the arrows CM. As the upward force is applied, the faying surfaces of the two half chambers are urged to approach each other, and as they do the weld element 81 is heated sufficient to melt. The result is that the faying surfaces become attached to each other at the weld element location. The fusion process might take 10 or more minutes. The electric power to the fusion weld element is then terminated and the weld region is allowed to conductively and convectively cool.

FIG. 28 is a cross section through the top portion of a chamber at the same location as shown in FIG. 27, which chamber has been formed in the foregoing fashion. Weld zones 83 at the top and bottom of the joint attach the half chambers 522A, 522B to each other. An advantage of the foregoing process as applied to hinged chambers is the avoidance of costly welding fixtures.

FIG. 29 is a more detail view of the joint 530. It will be appreciated that the regions on the faying surfaces 540A, 540B where there was no fusion weld element, are slightly spaced apart from each other at a gap 587 by the weld elements 83 which have fused to both faying surfaces. The amount and duration of electric current that is applied to the fusion weld element is carefully controlled, based on experiment that shows what is necessary to obtain a good weld. Thus, there is a reproducible small spacing between the faying surfaces away from the weld element location. And that provides a reproducible configuration of chamber when welding a multiplicity of chambers. If desired, tooling/fixtures or integral stops may be used to ensure the desired final configuration of joint and chamber.

As mentioned above other welding techniques including flat plate welding might be used when hinged-together half chambers are lifted by a force H to close the joint. A flat plate heating element may be inserted in the joint prior to lifting at the hinge point, then removed, followed by lifting of the half chambers to form the weld joint. Optionally, during the heating/melting step there is a first lifting with the hot plate captured in the joint for possible better heating. FIG. 30 is a cross section like FIG. 29 showing how faying surfaces 640A, 640B are fused by weld 683 at joint 630 after the faying surfaces have been melted by a hot plate. Stops 85A, 85B which extend from the bottom of the joint location were not heated by the hot plate, and thus they have acted cooperatively with the hinge pintle and gudgeon engagements to ensure achieving the desired joint/chamber configuration. Still other welding means may be used; for instance, ultrasonic welding may be used to fuse the faying surfaces. Thus, in carrying out this aspect of the invention the faying surfaces become fused directly (as by the hot plate or ultrasonic method) or indirectly (as by the use of the fusion weld element) to each other.

While it may not ordinarily be necessary, the top portions of the half chambers which are welded can be further secured to each other by using a method selected from the group consisting of (i) screw fastening; (ii) latching; (iii) clamping with one or more C-shape cross section clamps; (iv) running a locking rod lengthwise through a plurality of mating stirrups, wherein each half chamber has a plurality of stirrups; and combinations thereof.

The fusion weld element (which may be also referred to a fusion element or weld element herein) used in the preferred embodiment of the method described above is a component which may be heated, such as by electric resistance heating or electromagnetic induction heating to induce melting of the element and local plastic environment. As an example, the fusion weld element may be a commercial product known as PowerCore Welding Rod (PowerCore International Ltd., Ottawa, Ontario, Canada). See also U.S. Pat. Nos. 5,407,514 and 5,407,520, the disclosures of which are hereby incorporated by reference. An exemplary PowerCore brand rod is an about 3/16 inch diameter thermoplastic rod having integrated electric resistance wires of very fine diameter. The ends of the rod run out of the joint/part at selected end points; and when the wires comprising the rod are connected to an electric power source they rise in temperature and heat the rod and surrounding plastic causing melting and fusion. The fine wires remain a part of the finished joint. That portion of the fusion weld element which sticks from the end of the joint is severed, as by chiseling, and discarded.

As another example, the fusion weld element may be the preform which is part of the commercial Emabond electromagnetic welding system (Emabond Solutions Co., Norwood, N.J., U.S.) As described in Lamarca U.S. Pat. No. 7,984,738 (the disclosure of which is hereby incorporated by reference) the fusion weld element preform may be a structure comprised of plastic and magnetic particles. When an energized high frequency induction coil is placed in proximity to the joint, the particles act as susceptors of electromagnetic radiation and resultant induced eddy currents cause the element to become heated sufficiently to melt the preform and adjacent plastic, thereby fusing the joint. The metal particles remain within the fused plastic part.

While the article and methods of making have been described in the context of making a particularly large chamber, the principles and features of the invention can be applied to (a) making other arch shape or circular corrugated structures including pipe products; and (b) chambers which are not extraordinarily large and which can be wholly fabricated in a mold by means of single injection mold shot, instance a chamber or other product with a living hinge top joint.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention. While, for simplicity and easing the description, the invention has been described in terms of being oriented with the flanges on a horizontal plane, associated terms such as "top," "bottom," "base," "side," and the like should not be considered as limiting when applied to a real article, since a chamber can be stored and shipped in a choice of different orientations.

What is claimed is:

1. A method of fabricating a molded plastic chamber adapted for receiving water when buried beneath the surface of the earth, the chamber articulable from a transport configuration to a use configuration, the chamber comprising opposing side base flanges at a chamber base, two opposing sidewalls, one each running from a base flange to a chamber top, the chamber comprised of a first half chamber and a second half chamber connected to each other at a lengthwise running hinge joint at the top of the chamber;

wherein in use configuration said chamber has a length, a height, a base and associated base plane, said chamber top, an arch shape cross section, a vertical center plane running lengthwise and intersecting the chamber top, said two opposing corrugated sidewalls, each sidewall running upwardly from one of the base flanges to the top of the chamber, wherein base flanges are spaced apart and wherein each base flange has an interior edge lying in said base plane; and wherein in transport configuration the chamber has a height which is substantially reduced and a spacing between the base flanges which is substantially increased, compared respectively to the chamber height and the base flange spacing which the chamber has when in use configuration; which method comprises:

separately molding a first half chamber and a second half chamber, each half chamber having hinge features and at least one faying surface at the top portion of the half chamber;

mating a first half chamber with a second half chamber to form a chamber, wherein the hinge features on the mated pair of half chambers engage with each other as mutually rotatable features to form said hinge joint;

rotating the half chambers about the hinge joint to place the chamber in a configuration which is close to said use configuration and to position the at least one faying surface of the first half chamber into close proximity to the at least one faying surface of the second half chamber;

interposing a fusion weld element between said faying surfaced which are in close proximity; and, heating at least a portion of each said at least one faying surface, by means of said fusion weld element while contemporaneously applying upward force proximate to said hinge joint, so that the force of gravity urges each half chamber to rotate about the hinge joint, so that the faying surfaces move closer to each other.

2. The method of claim 1 wherein the first half chamber and second half chamber are substantially identical in configuration.

3. The method of claim 1 wherein, following said step of mating, a plurality of like-formed and like mated chambers are additionally fabricated, wherein the plurality of chambers are stacked and transported while nested with each other when in transport configuration, and wherein, during said steps of rotating the half chambers and heating each chamber is lifted and suspended vertically from the stack by pulling upwardly at the top of the chamber proximate to said hinge joint.

4. The method of claim 1 further comprising: further securing the top portion of the first half chamber to the top portion of a mated second half chamber, to furthermore keep the chamber in said use position, using a method selected from the group consisting of screw fastening, latching, clamping with one or more C-shape clamps, and the method of providing each half chamber with a plurality of mating stirrups and running a locking rod lengthwise through the plurality of mating stirrups, and combinations thereof.

5. The method of claim 1 wherein the hinge features formed in said step of molding a half chamber comprise forming a plurality of integral pintles on the first chamber and forming a plurality of gudgeons on the second half chamber, the pintles and gudgeons respectively located nearer to the top of each half chamber than is said at least one faying surface; and wherein said step of mating further comprises translating lengthwise the first half chamber relative to the second half chamber to engage the pintle features with the gudgeon features.

6. The method of claim 1 wherein during said step of molding or said step of mating at least one fusion weld element that melts due to application of electric current is tack welded to said at least one faying surface of at least one of said half chambers.

7. The method of claim 6 which further comprises flowing electric current through the fusion weld element of the chamber for a predetermined time so that the degree of melting of said at least one fusion weld element allows the mated at least one faying surfaces to move closer to one another by a predetermined amount.

8. The method of claim 2 wherein said chamber is shaped at one end with a larger corrugation for overlapping or a smaller corrugation for being overlapped by the end of a like chamber.

9. The method of claim 1 further comprising, after said mating step and prior to said rotating step: stacking the multiplicity of chambers one upon the other to form a nested stack of chambers wherein the chambers in said transport configuration; and, transporting the nested stack of chambers to a point of assembly and removing chambers successively from the nested stack.

* * * * *